US009686054B2

(12) United States Patent
Yang et al.

(10) Patent No.: US 9,686,054 B2
(45) Date of Patent: Jun. 20, 2017

(54) JOINT WAVEFORM DESIGN AND INTERFERENCE PRE-CANCELLATION FOR TIME-REVERSAL SYSTEMS

(71) Applicant: Origin Wireless Communications, Inc., Boston, MA (US)

(72) Inventors: Yu-Han Yang, San Jose, CA (US); K. J. Ray Liu, Potomac, MD (US)

(73) Assignee: Origin Wireless, Inc., Greenbelt, MD (US)

(*) Notice: Subject to any disclaimer, the term of this patent is extended or adjusted under 35 U.S.C. 154(b) by 112 days.

(21) Appl. No.: 14/615,984

(22) Filed: Feb. 6, 2015

(65) Prior Publication Data

US 2016/0021670 A1    Jan. 21, 2016

Related U.S. Application Data

(60) Provisional application No. 62/025,795, filed on Jul. 17, 2014.

(51) Int. Cl.
*H04W 4/00*   (2009.01)
*H04L 5/00*   (2006.01)
(Continued)

(52) U.S. Cl.
CPC ............. *H04L 5/0005* (2013.01); *H04L 1/00* (2013.01); *H04L 25/03343* (2013.01); *H04L 25/4975* (2013.01)

(58) Field of Classification Search
None
See application file for complete search history.

(56) References Cited

U.S. PATENT DOCUMENTS 2,933,702 A    4/1960  Bogert
3,767,855 A    10/1973 Ueno et al.
(Continued)

FOREIGN PATENT DOCUMENTS

EP    2 571 214        11/2012
WO    WO 2007/031088   3/2007
(Continued)

OTHER PUBLICATIONS

Han, F., Yang, Y.-H., Wang, B., Wu, Y., Liu, K.J.R., "Time-reversal division multiple access in multi-path channels", IEEE Globecom, Houston, Dec. 2011.
(Continued)

*Primary Examiner* — Otis L Thompson, Jr.
(74) *Attorney, Agent, or Firm* — Fish & Richardson P.C.

(57) ABSTRACT

A base station having an input module for receiving a probe signal sent from a terminal device, and a data processor for generating a signature waveform that is based on channel information derived from the probe signal, identifying data symbols intended to be transmitted to the terminal device, and modifying the data symbols based on the channel information. The modification of the data symbols is designed to reduce inter-symbol interference when the data symbols are received by the terminal device. The data processor generates a downlink signal based on the modified data symbols and the signature waveform. The base station generates a wide-band a radio frequency signal based on the downlink signal and transmits the radio frequency signal to the terminal device through a multipath channel such that a portion of the radio frequency signal intended for the terminal device focuses at the terminal device.

48 Claims, 18 Drawing Sheets

(51) Int. Cl.
H04L 1/00 (2006.01)
H04L 25/03 (2006.01)
H04L 25/497 (2006.01)

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,926,768 | A | 7/1999 | Lewiner et al. |
| 6,301,291 | B1 | 10/2001 | Rouphael et al. |
| 6,490,469 | B2 | 12/2002 | Candy |
| 6,862,326 | B1 | 3/2005 | Eran et al. |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 2003/0138053 | A1 | 7/2003 | Candy et al. |
| 2004/0156443 | A1 | 8/2004 | Dent |
| 2006/0098746 | A1 | 5/2006 | Candy et al. |
| 2006/0115031 | A1 | 6/2006 | Lindskog et al. |
| 2010/0302977 | A1 | 12/2010 | Huy et al. |
| 2010/0309829 | A1 | 12/2010 | Huy et al. |
| 2012/0155515 | A1 | 6/2012 | Smith et al. |
| 2012/0183037 | A1 | 7/2012 | Allpress et al. |
| 2012/0207234 | A1 | 8/2012 | de Rosny et al. |
| 2012/0257660 | A1 | 10/2012 | Smith et al. |
| 2012/0263056 | A1 | 10/2012 | Smith et al. |
| 2012/0328037 | A1 | 12/2012 | Hsu et al. |
| 2013/0201958 | A1 | 8/2013 | Huy et al. |
| 2013/0223503 | A1 | 8/2013 | Smith et al. |
| 2014/0022128 | A1 | 1/2014 | Smith |
| 2014/0126567 | A1 | 5/2014 | Husain et al. |
| 2014/0185596 | A1* | 7/2014 | Han .................. H04J 3/00 370/337 |
| 2014/0301494 | A1* | 10/2014 | Hsu .................. H04B 7/026 375/267 |
| 2015/0049745 | A1 | 2/2015 | Han et al. |
| 2015/0049792 | A1 | 2/2015 | Han et al. |
| 2015/0072624 | A1* | 3/2015 | Weiner .................. H04B 1/0475 455/65 |
| 2016/0242135 | A1* | 8/2016 | McLaughlin ..... H04W 56/0035 |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

Han, F., Yang, Y-H., Wang, B., Y. Wu, K.J.R. Liu, "Time-reversal division multiple access over multi-path channels", IEEE Trans. On Communications, vol. 60:1953-1965, Jul. 2012.
Han, Y., Chen, Y., and Liu, K.J.R, 'Time-Reversal with Limited Signature Precision: Tradeoff Between Complexity and Performance', Proc. IEEE Global Conference on Signal and Information Processing (GlobalSIP), Atlanta, Dec. 2014.
Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.
Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.
Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.
U.S. Appl. No. 13/706,342, filed Dec. 5, 2012, Yang et al.
U.S. Appl. No. 14/183,648, filed Feb. 19, 2014, Ma et al.
U.S. Appl. No. 14/202,651, filed Mar. 10, 2014, Chen et al.
U.S. Appl. No. 14/262,153, filed Apr. 25, 2014, Yang et al.
U.S. Appl. No. 14/605,611, filed Jan. 26, 2015, Chen et al.
Abbasi-Moghadam, D. and V.T. Vakili, "A SIMO one-bit time reversal for UWB communication systems", EURASIP J. Wireless Comm. and Networking, 2012:113, 2012.
Albert, D., L. Liu, M. L. Moran, "Time Reversal processing for source location in an urban environment (L)", J. Acoust. Soc. Am., vol. 118, No. 2, pp. 616-619, Aug. 2005.
Brysev, A.P., L.M. Krutyanskii, V'L. Preobrazhenskii, "Wave Phase Conjugation in ultrasonic beams", Physics-Uspekhi, vol. 41, No. 8, pp. 793-805, 1998.
Chang, Y.H., S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.
Chen, Y. et al., "Time-reversal wideband communications," IEEE Signal Processing Letters, vol. 20(12):1219-1222 (Dec. 2013).
Chen, Y., F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.
Daniels, R.C. and R. W. Heath, "Improving on time-reversal with MISO precoding," in the Proceedings IWC/WPMC, Aalborg, Denmark, Sep. 2005.
Daniels, R.C. and R. W. Heath, "MISO precoding for temporal and spatial focusing" in the Proceedings of the Eighth International Symposium on Wireless Personal Communications Conference, Aalborg, Denmark, 2005.
de Rosny, J., G. Lerosey and M. Fink, "Theory of Electromagnetic Time-Reversal Mirrors", IEEE Trans. Antennas Propag., vol. 58, No. 10, pp. 3139-3149, Oct. 2010.
Derode, A., A. Tourin, and M. Fink, "Ultrasonic pulse compression with one-bit time reversal through multiple scattering", J. Appl. Phys., vol. 85, No. 9, pp. 6343-6352, May 1999.
Derode, A., A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.
Derode, A., P. Roux, and M. Fink, "Robust Acoustic Time Reversal and High-Order Multiple Scattering", Phys. Rev. Left., vol. 75, No. 23, pp. 4206-4210, Dec. 1995.
Dorme, C. and M. Fink, "Focusing in transmit-receive mode through inhomogeneous media: The time reversal matched filter approach", J. Acoust. Soc. Am., vol. 98, Pt. 1, pp. 1155-1162, Aug. 1995.
Edelmann, G.F., T. Akal, W.S. Hodgkiss, S. Kim, W.A. Kuperman and H.C. Song, "An Initial Demonstration of Underwater Acoustic Communication Using Time Reversal", IEEE J. Ocean Eng., vol. 27, No. 3, Jul. 2002.
Emami et al., "Matched Filtering with Rate Back-off for Low Complexity Communications in Very Large Delay Spread Channels," 38th Asilomar Conference on Signals, Systems and Computers, pp. 218-222, 2004.
Emami, S.M., J. Hansen, A.D. Kim, G. Papanicolaou, A.J. Paulraj, D. Cheung, C. Prettie, "Predicted Time Reversal Performance in Wireless Communications using Channel Measurements", publication details unknown.
Fink, M. and C. Prada, "Acoustic Time-Reversal Mirrors", Inverse Problems, vol. 17, pp. R1-R38, 2001.

(56) References Cited

OTHER PUBLICATIONS

Fink, M., "Time Reversal of Ultrasonic Fields-Part I: Basic Principals", IEEE Trans. Ultrasonics, Ferroelectrics and Freq. Contr., vol. 39, No. 5, pp. 555-566, Sep. 1992.
Fink, M., "Time-Reversal Mirrors", J. Phys. D: Appl. Phys., vol. 26, pp. 1333-1350, 1993.
Fink, M., "Time-Reversed Acoustics", Scientific American, pp. 91-97, Nov. 1999.
Fink, M., C. Prada, F. Wu, and D. Cassereau, "Self focusing in inhomogeneous media with time reversal acoustic mirrors," IEEE Ultrasonics Symposium, vol. 1, pp. 681-686, 1989.
Fontana, R.J., S.J. Gunderson, "Ultra-Wideband Precision Asset Location System", Proc. of the IEEE Conf. on UWB Sys. And Tech., pp. 147-150, 2002.
Guo, N., B.M. Sadler and R.C. Qiu, "Reduced-Complexity UWB Time-Reversal Techniques and Experimental Results", IEEE Trans. On Wireless Comm., vol. 6, No. 12, Dec. 2007.
Han, F. and K.J.R. Liu, "A multiuser TRDMA uplink system with 2D parallel interference cancellation," IEEE Transactions on Communications, vol. 62(3):1011-1022 (Mar. 2014).
Han, F. and K.J.R. Liu, "An Interference Cancellation Scheme for the Multiuser TRDMA Uplink System," Global Telecommunications Conference, pp. 3583-3588 (2013).
Han, F., "Energy Efficient Optimization in Green Wireless Networks", University of Maryland Ph. D. Dissertation, 2013.
Han, F., Y.H. Yang, B. Wang, Y. Wu, K.J.R. Liu, "Time-reversal division multiple access in multi-path channels," Global Telecommunications Conference, pp. 1-5 (2011).
Han, F., Y.H. Yang, B. Wang, Y. Wu, K.J.R. Liu, "Time-reversal division multiple access over multi-path channels," IEEE Transactions on Communications, vol. 60(7):1953-1965 (Jul. 2012).
Henty, B.E. and D.D. Stancil, "Multipath-Enabled Super-Resolution for rf and Microwave Communication using Phase-Conjugate Arrays", Phys. Rev. Lett., vol. 93, 243904, Dec. 2004.
Jin, JY. and .M.F. Moura, "Time Reversal Detection Using Antenna Arrays", IEEE Trans. On Signal Process., vol. 57, No. 4, Apr. 2009.
Khalegi, A., G. El Zein and I. Navqi, "Demonstration of Time-Reversal in Indoor Ultra-Wideband Communication: Time Domain Measurement", IEEE Proc. of ISWCS, pp. 465-468, 2007.
Kuperman, W.A., W.S. Hodgkiss, H.C. Song, T. Akal, C. Ferla, D.R. Jackson, "Phase conjugation in the ocean: Experimental demonstration pf an acoustic time-reversal mirror", J. Acoust. Soc. Am., vol. 103, No. 1, pp. 25-40, Jan. 1998.
Kyritsi, P. and G. Papanicolau, "One-bit Time Reversal for WLAN Applications", IEEE 16th Intern. Symp. On Personal, Indoor and Mobile Radio Comm., pp. 532-536, 2005.
Kyritsi, P. et al., "Time reversal and zero-forcing equalization for fixed wireless access channels," 39th Asilomar Conference on Signals, Systems and Computers, pp. 1297-1301 (2005).
Kyritsi, P. et al., "Time reversal techniques for wireless communications," IEEE Vehicular Technology Conference, vol. 1:47-51 (2004).
Lemoult, F., G. Lerosey, J. de Rosny, and M. Fink, "Manipulating Spatiotemporal Degrees of Freedom in Waves of Random Media", Phys. Rev. Lett., vol. 103, 173902, Oct. 2009.
Lemoult, F., G. Lerosey, J. de Rosny, and M. Fink, "Resonant Metalenses for Breaking the Diffraction Barrier", Phys. Rev. Lett., vol. 104, 203901, May 2010.
Lerosey, G., J. de Rosny, A. Tourin, A. Derode, G. Montaldo and M. Fink, "Time Reversal of Electromagnetic Waves", Phys. Rev. Lett., vol. 92, No. 19, 193904, May 2004.
Lerosey, G., J. de Rosny, A. Tourin, A. Derode, G. Montaldo and M. Fink, "Time Reversal of Electromagnetic Waves and Telecommunication", Radio Science, vol. 40, RS6S12, 2005.
Lerosey, G., J. de Rosny, A. Tourin, A. Derode, M. Fink, "Time Reversal of Wideband Microwaves", Appl. Phys. Lett., vol. 88, 154101, Apr. 2006.
Lerosey, G., J. de Rosny, A. Tourin, and M. Fink, "Focusing beyond the diffraction limit with far-field time reversal", Science, vol. 315, pp. 1120-1122, Feb. 2007.

Lienard, M. et al., "Focusing gain model of time-reversed signals in dense multipath channels," IEEE Antennas and Wireless Propagation Letters, vol. 11:1064-1067 ( 2012).
Ma, H., F. Han, and K.J.R. Liu, "Interference-Mitigating Broadband Secondary User Downlink System: A Time-Reversal Solution", Global Telecommunications Conference, pp. 884-889, (2013).
Montaldo, G., G. Lerosey, A. Derode, A. Tourin, J. de Rosny, and M. Fink, "Telecommunication in a disordered environment with iterative time reversal," Waves Random Media, vol. 14, pp. 287-302, May 2004.
Moura, J.M.F. and Y. Jin, "Detection by Time Reversal: Single Antenna", IEEE Trans. On Signal Process., vol. 55, No. 1, Jan. 2007.
Moura, J.M.F. and Y. Jin, "Time Reversal Imaging by Adaptive Interference Canceling", IEEE Trans. On Signal Process., vol. 56, No. 1, Jan. 2008.
Naqvi, I.H., A. Khaleghi and G. El Zein, "Performance Enhancement of Multiuser Time Reversal UWB Communication System", Proc. of IEEE ISWCS, pp. 567-571, 2007.
Naqvi, I.H., G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.
Naqvi, I.H., P. Besnier and G. El Zein, "Effects of Time Variant Channel on a Time Reversal UWB System", Global Telecommunications Conference, (2009).
Nguyen, H. T. et al., "A time reversal transmission approach for multiuser UWB communications," IEEE Transactions on Antennas and Propagation, vol. 54: 3216-3224 (Nov. 2006).
Nguyen, H. T., "On the performance of one bit time reversal for multi-user wireless communications", IEEE Proc. of ISWCS, pp. 672-676, 2007.
Nguyen, H., F. Zheng, and T. Kaiser, "Antenna Selection for Time Reversal MIMO UWB Systems", IEEE Vehicle Technology Conference, pp. 1-5, 2009.
Nguyen, H., Z. Zhao, F. Zheng and T. Kaiser, "On the MSI Mitigation for MIMO UWB Time Reversal Systems", Proc. of IEEE International Conference on Ultra-Wideband, pp. 295-299, 2009.
Nguyen, H., Z. Zhao, F. Zheng, and T. Kaiser, "Preequalizer Design for Spatial Multiplexing SIMO-UWB TR Systems", IEEE Trans. On Vehicular Tech., vol. 59, No. 8, Oct. 2010.
Nguyen, H.T., "Partial one bit time reversal for UWB impulse radio multi-user communications", IEEE Proc. of ICCE, 2008.
Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.
Parvulescu, A. and Clay, C. S., "Reproducibility of Signal Transmissions in the Ocean", The Radio and Electronic Engineer, pp. 223-228, Apr. 1965.
Phan-Huy, D. T., S.B. Halima, M. Helard, "Frequency Division Duplex Time Reversal", Global Telecommunications Conference, (2011).
Porcino, D., "Ultra-Wideband Radio Technology: Potential and Challenges Ahead", IEEE Communications Mag., pp. 66-74, Jul. 2003.
Prada, C., F. Wu, and M. Fink, "The iterative time reversal mirror: A solution to self-focusing in the pulse echo mode," J. Acoustic Society of America, vol. 90, pp. 1119-1129, 1991.
Price, R., "A Communication Technique for Multipath Channels", Proceeding of the IRE, vol. 46:555-570 (1958).
Qiu, R. C. et al., "Time reversal with miso for ultra-wideband communications: Experimental results," IEEE Antenna and Wireless Propagation Letters, vol. 5:269-273 (2006).

(56) References Cited

OTHER PUBLICATIONS

Rode, J. P., M.J. Hsu, D. Smith and A. Hussain, "Collaborative Beamfocusing Radio (COBRA)", Proc. of SPIE, vol. 8753, pp. 87530J-1-11, 2013.

Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.

Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.

Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.

Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.

Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).

Wang, B. et al., "Green wireless communications: A time-reversal paradigm," IEEE Journal of Selected Areas in Communications, vol. 29:1698-1710 (2011).

Wu, F., J.L. Thomas, and M. Fink, "Time Reversal of Ultrasonic Fields-Part II: Experimental Results", IEEE Trans. Ultrasonics, Ferroelectrics and Freq. Contr., vol. 39, No. 5, pp. 567-578, Sep. 1992.

Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, Pier 77, pp. 329-342, 2007.

Yang, Y. H., "Waveform Design and Network Selection in Wideband Small Cell Networks", University of Maryland Ph. D. Thesis, 2013.

Yang, Y. H., B. Wang and K.J.R. Liu, "Waveform Design for Sum Rate Optimization in Time-Reversal Multiuser Downlink Systems", Global Telecommunications Conference, (2011).

Yang, Yu-Han et al., "Near-optimal waveform design for sum rate optimization in time-reversal multiuser downlink systems," vol. 12(1):346-357 (Jan. 2013).

Yuanwei, Jin et al., "Adaptive time reversal beamforming in dense multipath communication networks," 2008 42nd Asilomar Conference on Signals, Systems and Computers, pp. 2027-2031 (Oct. 2008).

Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

\* cited by examiner

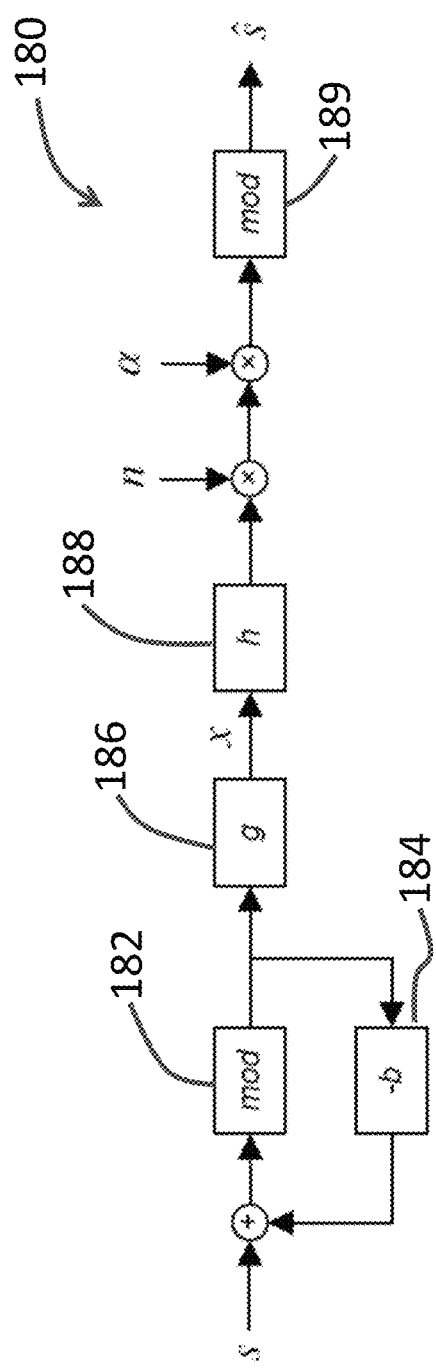
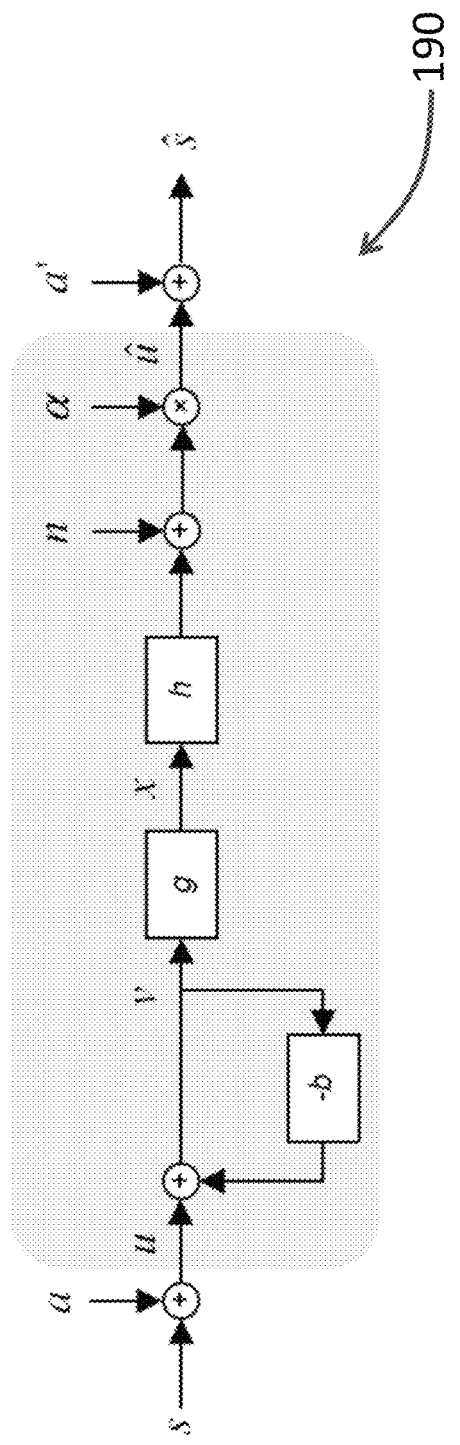
FIG. 7A
FIG. 7B

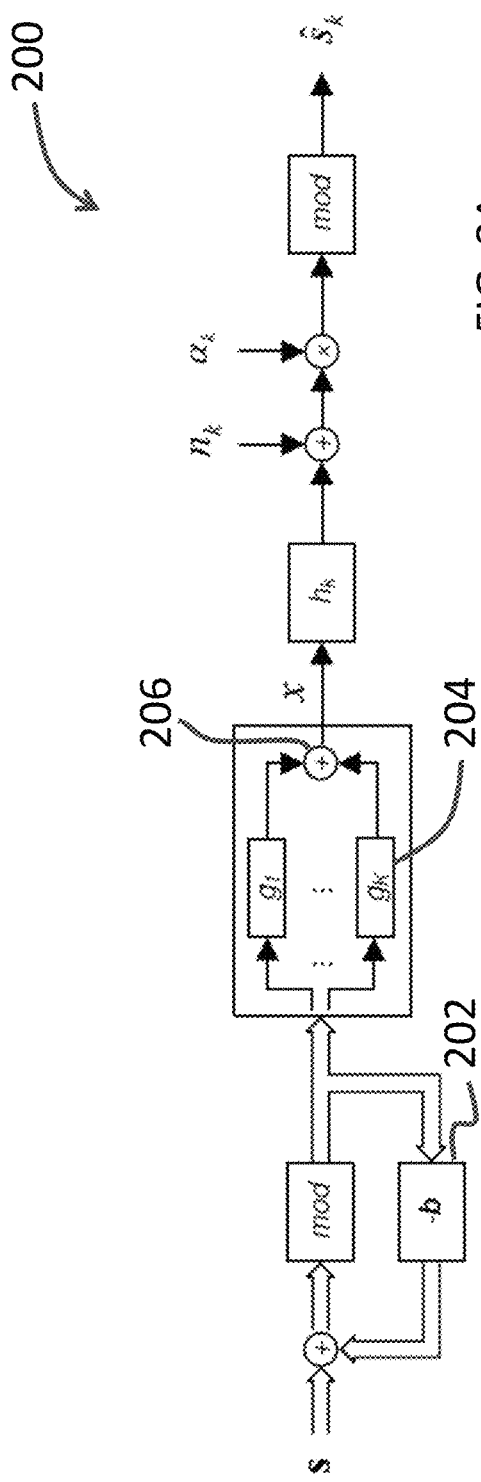
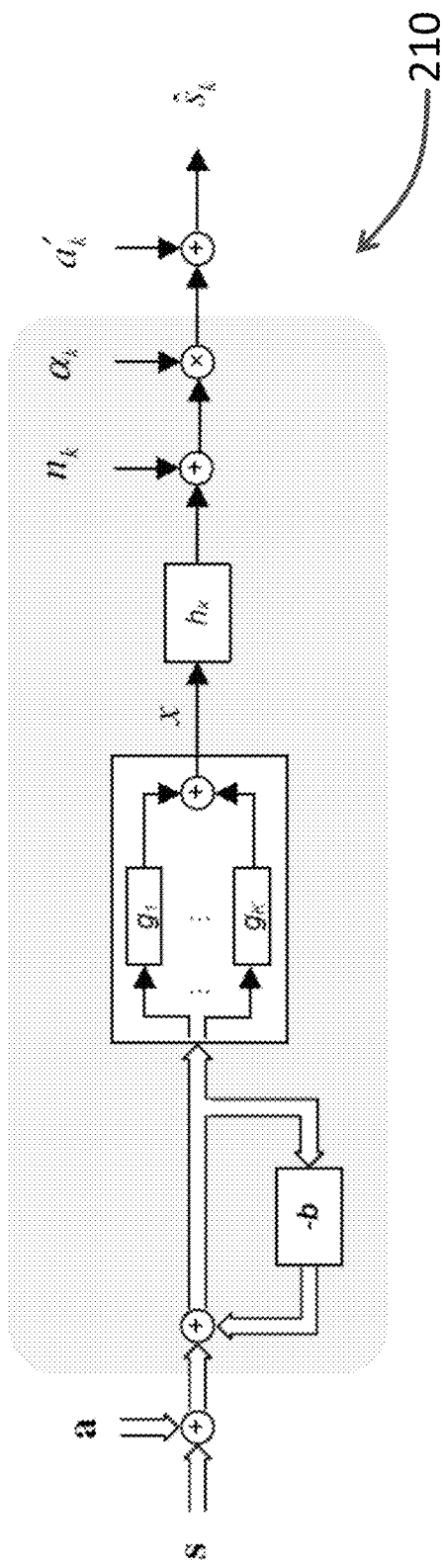
FIG. 8A
FIG. 8B

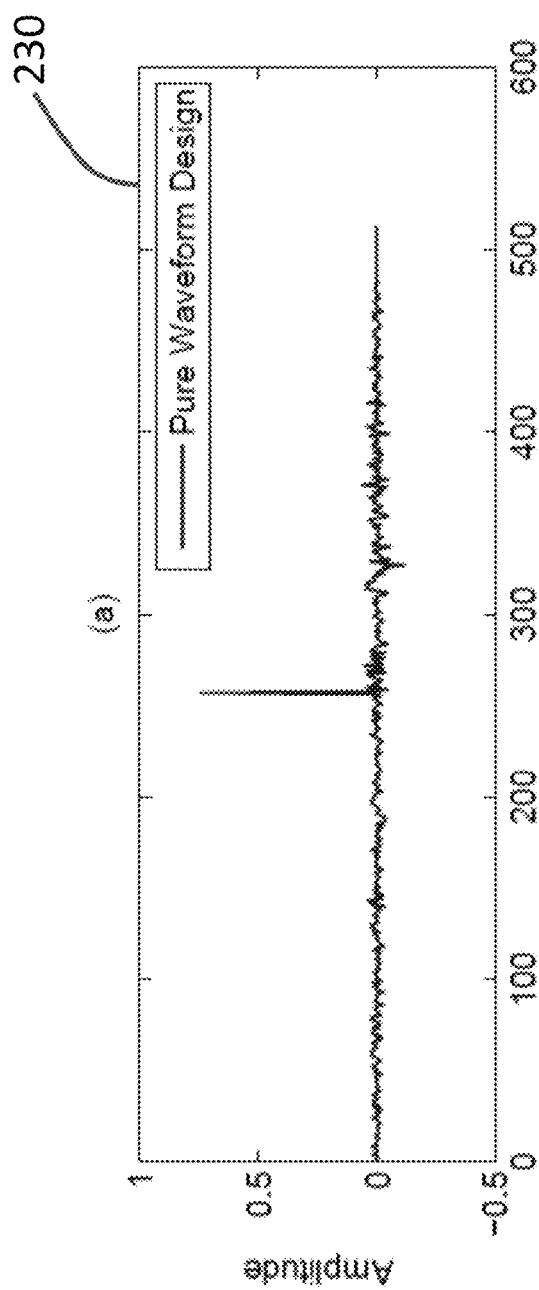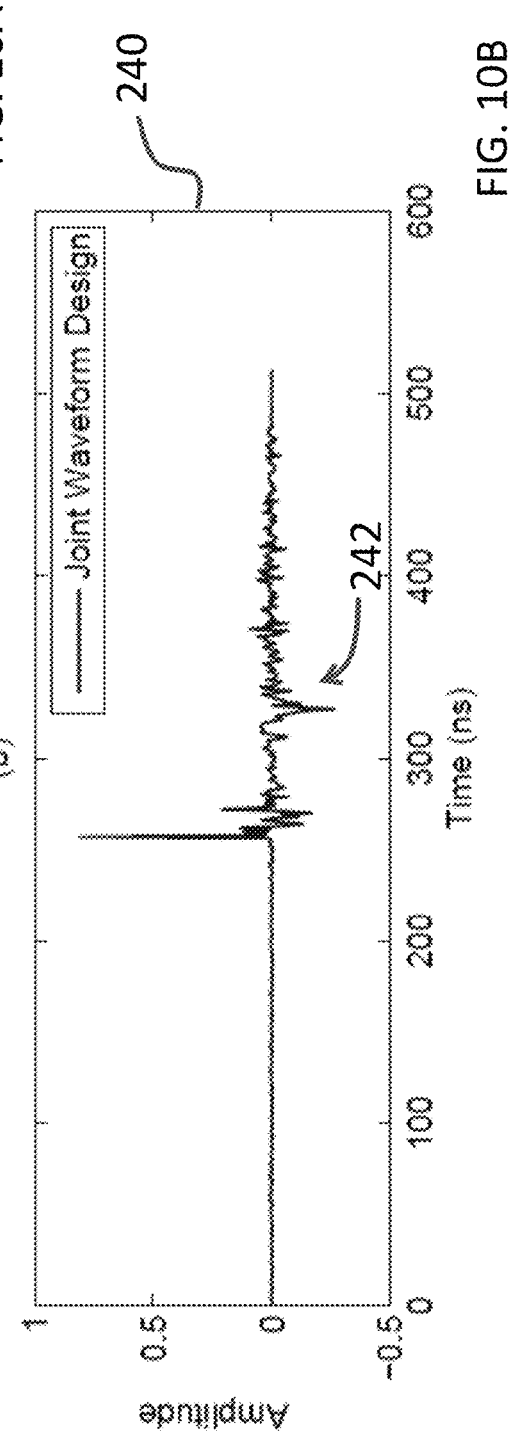

JOINT WAVEFORM DESIGN AND INTERFERENCE PRE-CANCELLATION FOR TIME-REVERSAL SYSTEMS

CROSS-REFERENCE TO RELATED APPLICATIONS

This application claims priority to U.S. Patent Application 62/025,795, filed on Jul. 17, 2014. The entire disclosure of the above application is incorporated herein by reference.

TECHNICAL FIELD

This disclosure relates to time-reversal systems.

BACKGROUND

A time-reversal division multiple access (TRDMA) system provides a cost-effective single-carrier technology for broadband communications and at the same time leverages the degrees of freedom in a large number of multi-paths to form a unique high-resolution spatial focusing effect. In some time-reversal communication systems, when a transceiver A intends to transmit information to a transceiver B, transceiver B first sends a delta-like pilot pulse that propagates through a scattering and multi-path environment, and the signals are received by transceiver A. Transceiver A transmits time-reversed signals back through the same channel to transceiver B. Based on channel reciprocity, a time-reversal communication system leverages the multi-path channel as a matched filter, i.e., treats the environment as a facilitating matched filter computing machine, and focuses the wave at the receiver in both space and time domains. When the symbol rate is very high, inter-symbol interference (ISI) may occur and reduce the performance of the system.

SUMMARY

In general, in one aspect, an apparatus for time-reversal communication is provided. The apparatus includes a base station that has an input module and a data processor. The input module is configured to receive a probe signal sent from a terminal device. The data processor is configured to generate a signature waveform that is based on channel information derived from the probe signal, identify data symbols intended to be transmitted to the terminal device, and modify the data symbols based on the channel information, the modification of the data symbols designed to reduce inter-symbol interference when the data symbols are received by the terminal device, and generate a downlink signal based on the modified data symbols and the signature waveform. The base station is configured to generate a wide-band radio frequency signal based on the downlink signal and transmit the radio frequency signal to the terminal device through a multipath channel such that a portion of the radio frequency signal intended for the terminal device focuses at the terminal device.

Implementations of the apparatus may include one or more of the following features. The wide-band radio frequency signal can include a second portion intended for a second terminal device located at a distance from the first terminal device, in which the second portion of the radio frequency signal focuses at the second terminal device.

The first portion of the radio frequency signal intended for the first terminal device and the second portion of the radio frequency signal intended for the second terminal device can occupy a same frequency band and can be transmitted from the base station simultaneously.

The base station further includes a radio frequency modulator to modulate the downlink signal to generate the wide-band radio frequency signal.

The signature waveform can include a complex signal having a real part and an imaginary part.

The data processor can be configured to generate the signature waveform based on a time-reversed signal of the channel response signal.

The data processor can be configured to generate the downlink signal by performing a convolution of the signature waveform and the modified data symbols.

The data processor can be configured to modify the data symbols by subtracting, from each data symbol, a term that is associated with inter-symbol interference.

The data processor can be configured to calculate the term based on the channel information and the signature waveform.

The data processor can be configured to modify a data symbol by subtracting, from the data symbol, a term that is calculated based on at least one previous data symbol, the signature waveform, and channel information.

The data processor can be configured to determine a gain value based on the channel information, the gain value to be applied by the second device to the received data symbols.

The data processor can be configured to generate the signature waveform based on the channel information and the gain value.

The signature waveform can have an inverse relationship with respect to the gain value.

The base station can include a mobile phone, a camera, a laptop computer, a tablet computer, a wearable computing device, a pair of eyeglasses, a helmet, a goggle, a car, a personal transportation device, a robot, a robotic arm, an unmanned aerial vehicle, a radio, an audio player, a health monitor, a headphone, an object tracker, a name tag, a clothing tag, a merchandise tag, a packaging box, a pen, a stylus, a watch, a bracelet, a necklace, or a cart.

In general, in another aspect, an apparatus for use in a communication system is provided. The apparatus includes a first device configured to transmit a wide-band radio frequency signal designed such that after the radio frequency signal propagates through a multipath channel, a first portion of the radio frequency signal intended for a second device focuses at the second device, and a second portion of the radio frequency signal intended for a third device focuses at the third device located at a distance from the second device. The first device is further configured to identify data symbols intended to be transmitted to the second device, and modify the data symbols based on channel information, the modification of the data symbols designed to reduce inter-symbol interference when the data symbols are received by the second device.

Implementations of the apparatus may include one or more of the following features. The first device can include an input module to receive a probe signal sent from the second device; and a data processor configured to generate a signature waveform that is based on channel information derived from the probe signal, identify the data symbols intended to be transmitted to the second device, and modify the data symbols based on the channel information, the modification of the data symbols designed to reduce inter-symbol interference when the data symbols are received by the second device, and generate a transmit signal based on the modified data symbols and the signature waveform.

The first device can include a radio frequency modulator to modulate the downlink signal to generate the wide-band radio frequency signal.

The data processor can be configured to generate the signature waveform based on a time-reversed signal of the channel response signal.

The data processor can be configured to generate the transmit signal by performing a convolution of the signature waveform and the modified data symbols.

The data processor can be configured to modify the data symbols by subtracting, from each data symbol, a term that is associated with inter-symbol interference.

The data processor can be configured to calculate the term based on the channel information and the signature waveform.

The data processor can be configured to modify a data symbol by subtracting, from the data symbol, a term that is calculated based on at least one previous data symbol, the signature waveform, and channel information.

The data processor can be configured to determine a gain value based on the channel information, the gain value to be applied by the second device to the received data symbols.

The data processor can be configured to generate the signature waveform based on the channel information and the gain value.

The signature waveform can have an inverse relationship with respect to the gain value.

The signature waveform can include a complex signal having a real part and an imaginary part.

The first portion of the radio frequency signal intended for the second device and the second portion of the radio frequency signal intended for the third device can occupy a same frequency band and can be transmitted from the first device simultaneously.

The apparatus can include a mobile phone, a camera, a laptop computer, a tablet computer, a wearable computing device, a pair of eyeglasses, a helmet, a goggle, a car, a personal transportation device, a robot, a robotic arm, an unmanned aerial vehicle, a radio, an audio player, a health monitor, a headphone, an object tracker, a name tag, a clothing tag, a merchandise tag, a packaging box, a pen, a stylus, a watch, a bracelet, a necklace, or a cart.

In general, in another aspect, a method for communication is provided. The method includes at a first device, receiving a probe signal sent from a second device through a multipath channel; generating a signature waveform that is based on channel information derived from the probe signal; identifying data symbols intended to be transmitted to the second device, and modifying the data symbols based on channel information, the modification of the data symbols designed to reduce inter-symbol interference when the data symbols are received by the second device; and generating a transmission signal based on the modified data symbols and the signature waveform.

Implementations of the method may include one or more of the following features. The transmission signal can have a first component and a second component, in which the first component includes data symbols intended for the second device, the second component includes data symbols intended for a third device, and the method can include transmitting the first and second components simultaneously.

The signature waveform can include a complex signal having a real part and an imaginary part.

Generating a signature waveform can include generating a signature waveform that is based on a time-reversed signal of the channel response signal.

Generating the transmission signal can include performing a convolution of the signature waveform and the modified data symbols.

Modifying the data symbols can include subtracting, from each data symbol, a term that is associated with inter-symbol interference.

The term can be calculated based on the channel information and the signature waveform.

Modifying a data symbol can include subtracting, from the data symbol, a term that is calculated based on at least one previous data symbol, the signature waveform, and channel information.

The method can include determining a gain value based on the channel information, the gain value to be applied by the second device to the received data symbols.

Generating a signature waveform can include generating a signature waveform based on the channel information and the gain value.

The signature waveform can have an inverse relationship with respect to the gain value.

In general, in another aspect, a method for communication is provided. The method includes at a first device, receiving a probe signal sent from a second device through a multipath channel, in which the first and second devices are part of a wide-band communication system configured such that when the first device transmits a radio frequency signal intended for the second device through the multipath channel, the radio frequency signal focuses at the second device; determining a gain value to be applied by the second device to data symbols received at the second device; receiving a probe signal sent from a second device through a multipath channel, the probe signal received at the first device having a waveform that is different from the waveform sent by the second device due to influence of the multipath channel; generating a signature waveform that is based on channel information derived from the probe signal; identifying data symbols intended to be transmitted to the second device, and modifying the data symbols based on channel information, the modification of the data symbols designed to reduce inter-symbol interference when the data symbols are received by the second device; and generating a transmission signal based on the modified data symbols and the signature waveform.

Implementations of the method may include one or more of the following features. The method can include modifying the signature waveform based on channel information, the modification of the signature waveform designed to reduce inter-symbol interference when the data symbols are received by the second device.

The transmission signal can have a first component and a second component, the first component includes data symbols intended for the second device, the second component includes data symbols intended for a third device, and the method can include transmitting the first and second components simultaneously.

The signature waveform can include a complex signal having a real part and an imaginary part.

Generating a signature waveform can include generating a signature waveform that is based on a time-reversed signal of the channel response signal.

Generating the transmission signal can include performing a convolution of the signature waveform and the modified data symbols.

Modifying the data symbols can include subtracting, from each data symbol, a term that is associated with inter-symbol interference.

The term can be calculated based on the channel information and the signature waveform.

Modifying a data symbol can include subtracting, from the data symbol, a term that is calculated based on at least one previous data symbol, the signature waveform, and channel information.

The method can include determining a gain value based on the channel information, the gain value to be applied by the second device to the received data symbols.

Generating a signature waveform can include generating a signature waveform based on the channel information and the gain value.

The signature waveform can have an inverse relationship with respect to the gain value.

Other aspects include other combinations of the features recited above and other features, expressed as methods, apparatus, systems, program products, and in other ways. Advantages of the aspects and implementations may include one or more of the following. The inter-symbol interference and inter-user interference may be reduced, the errors may be reduced, and the overall performance of the communication system may be improved.

DESCRIPTION OF DRAWINGS

FIGS. 7A and 7B are diagrams of joint waveform design and interference pre-cancellation for an exemplary single-user time-reversal system.

FIGS. 8A and 8B are diagrams of joint waveform design and interference pre-cancellation for an exemplary multi-user time-reversal system.

FIGS. 10A and 10B are graphs showing the composite effect of the transmit waveform and the channel impulse response for exemplary pure waveform design and joint waveform design, respectively.

Like reference symbols in the various drawings indicate like elements.

DETAILED DESCRIPTION

Figure 1:
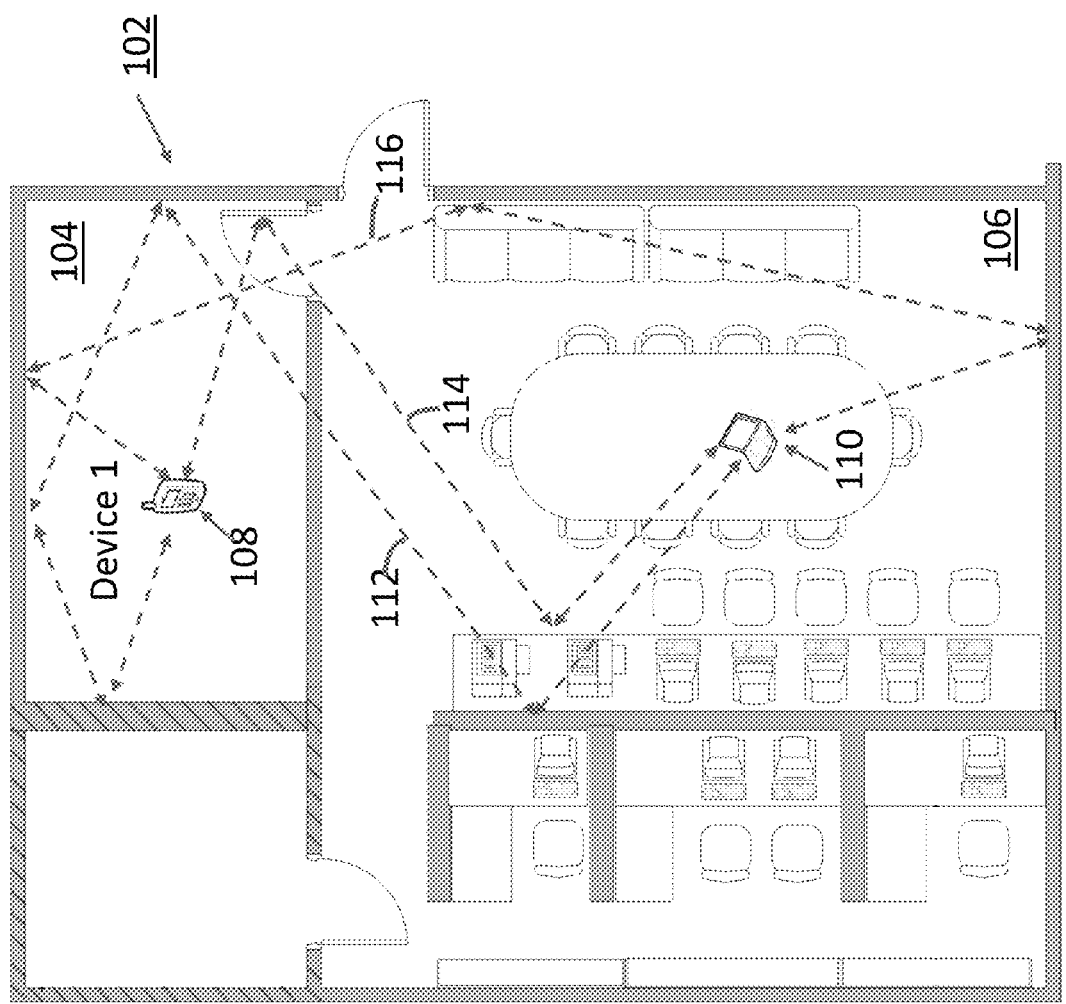
FIG. 1 is a diagram showing an exemplary environment for operating a time-reversal system.

This disclosure describes a novel time-reversal division multiple access communication system that uses joint waveform design and interference pre-cancellation by exploiting the symbol information to further improve the performance. In the time-reversal communication system, the causal inter-symbol interference is subtracted by interference pre-cancellation and the anti-causal inter-symbol interference can be further suppressed by the waveform design with more degrees of freedom. The transmitter uses the information of previous symbols to enhance the signal quality while the receiver structure remains simple. In the multi-user scenario, both the inter-user interference (IUI) and inter-symbol interference can be similarly categorized by its causality, and then be reduced accordingly by the time-reversal communication system. Determining the signal waveform when there are multiple users can be considered a non-convex optimization problem that can be solved by, e.g., two exemplary iterative processes described below. These iterative processes can converge to suboptimal solutions. Simulation results validate the convergence behavior and demonstrate the performance improvement over past non joint waveform designs.

In this description, depending on context, the term "user" may refer to a device. For example, in a system that has multiple devices communicating with a base station, the term "multi-user uplink" refers to the uplink by multiple devices, the term "multi-user downlink" refers to the downlink to multiple devices, and the term "inter-user interference" refers to the interference among various devices. The term "causal interference" refers to the interference caused by an earlier-transmitted symbol to a later-transmitted symbol, and the term "anti-causal interference" refers to the interference caused by a later-transmitted symbol to an earlier-transmitted symbol. For example, suppose symbols s1, s2, and s3 are transmitted in sequence, with symbol s1 transmitted first and symbol s3 transmitted last, and that symbol s1 overlaps symbols s2 and s3. The interference caused by symbol s1 to symbol s2 (or s3) is causal interference, whereas the interference caused by symbol s2 (or s3) to symbol s1 is anti-causal interference.

The time-reversal division multiple access technology has a wide variety of applications. For example, an intelligent house may include one or more computers that communicate wirelessly with several sensors (e.g., temperature, humidity, light, and motion sensors), meters (e.g., electricity and water meters), appliances (e.g., refrigerator, oven, washing machine), electronic devices (e.g., television, digital video recorder, audio/video system, telephone, digital photo album, intelligent lamp, security system), climate control systems (e.g., fans, thermostats for air conditioning and heating, motorized shades), power generators (e.g., backyard wind turbine, solar panel, geothermal energy system).

To reduce the cost of communication, it may be preferable that the devices communicating with the computer be simple without the need to perform complex signal processing. The computer may function as a base station or be coupled to a base station that performs most of the signal processing when transmitting signals to the devices and receiving signals sent from the devices.

A home lighting system may include a controller that controls intelligent light bulbs (e.g., bulbs that use light emitting diodes (LED) or laser technology) to adjust color and/or brightness of the bulbs. The controller may communicate with the intelligent bulbs using time-reversal wireless communication. The communication module at the light bulb using time-reversal technology can be made at a lower cost compared to, e.g., a communication module using Wi-Fi or Bluetooth technology. Thermostat controllers, smoke detectors, security systems, and phone systems may communicate with one another using time-reversal communication technology. For example, a smoke/carbon monoxide detector that detects smoke or carbon monoxide may communicate with the thermostat to shut off the boiler, communicate with a home security system that notifies the fire department, or communicate with a phone system that sends an alert text or voice message or e-mail to the home owner. The smoke detector may have motion sensors that can detect the presence of people, and may announce voice messages in case of emergency. For example, if a home has smoke detectors installed at several locations, a first smoke detector that detects smoke in the first floor kitchen may communicate with a second smoke detector located on the third floor bedroom where a home owner is sleeping to cause the second smoke detector to broadcast an announcement alerting the home owner that smoke is detected in the first floor kitchen.

A home or office may have multiple devices that have clocks. The devices may communicate with a controller that provides an accurate time signal so that all the devices in the home or office can be synchronized. The controller can provide the time signals to the various devices using time-reversal wireless communication.

Plant care (e.g., in a greenhouse, home, or office building) may be partially automated by use of sensors that sense soil conditions and provide information to indicate whether watering or fertilization is needed, the amount of water and fertilizer required, and the type of fertilizer needed. For example, a plant care module may be inserted into the soil or planting medium adjacent to each plant, in which the plant care module may have a storage that stores information about the plant, such as the type of plant, the level of moisture that should be maintained, and how often and what type of fertilizers need to be applied, the date and time in which water or fertilizer was applied, and the type and amount of fertilizer applied. The plant care module may have sensors that sense the soil conditions and a communication module to communicate with an automated plant care system, such as a robot that can provide water and fertilizers based on the information sent from the plant care module. The plant care module can communicate with a lighting system that controls the amount of light provided to the plant and a temperature control system that controls the temperature in the vicinity of the plant. For example, the communication module can use time-reversal wireless communication technology that requires little power, and the plant care modules can be powered by solar cells to eliminate the need to change batteries.

Vehicles may have time-reversal wireless communication modules that communicate with various sensors, beacons, or data processing modules in garages, driveways, or buildings. For example, garages may be retrofitted with sensors and beacons to assist vehicles (e.g., autonomous vehicles) to find and park into parking spaces. Robots may have time-reversal wireless communication modules that communicate with various sensors, beacons, or data processing modules in homes or office buildings to assist in navigation or to provide information about the environmental conditions or other information (e.g., tasks that need to be performed at particular locations). As discussed below, time-reversal wireless communication has an asymmetrical nature in which the base station performs most of the signal processing as both a transmitter (for the downlink) and receiver (for the uplink), allowing the use of low complexity terminal devices. Thus, a large number of terminal devices (e.g., sensors) can be deployed at a low cost. Because the terminal devices require little power, they can be powered by solar cells or piezoelectric components to eliminate the need to recharge batteries, or be power by batteries that last for a long lifetime.

In an assembly plant, critical components may have embedded processors that store and process data and communicate with one or more external controllers using time-reversal wireless communication technology to ensure that the critical components function properly, and have been properly processed in previous stages before moving to the next stage. For example, an engine of a vehicle can have an embedded module having a data processor and storage that stores information about all the tests that have been performed in previous stages before being assembled with the car chassis. An airplane may be assembled from components manufactured by companies in different countries. Each component can have an embedded module that has a data processor and storage that stores information about the component, such as characteristics of the components and results of tests that have been performed on the component. The embedded modules may communicate with one or more external controllers using time-reversal wireless communication technology. Use of such embedded modules can increase the quality of the final products by ensuring that each component has been properly processed and tested.

In some examples, a controller may communicate with multiple sensors or devices using time-reversal wireless communication, and communicate with other devices using other communication protocols. For example, a controller may communicate with intelligent light bulbs, temperature sensors, and power meters using time-reversal wireless communication, and communicate with a smart phone using Wi-Fi communication. The controller serves as a bridge between devices that use low cost time-reversal communication modules and devices (e.g., smart phones or network routers) that follow Wi-Fi or Bluetooth communication protocols.

For example, an intelligent factory may include one or more computers that communicate wirelessly with robots working in assembly lines, vehicles that move supplies and assembled products, climate control systems, security systems, inventory control systems, and power systems. For example, a laboratory may include one or more computers that communicate wirelessly with instruments that monitor parameters when conducting experiments.

In the examples above, the computer (or controller) can communicate with the devices using time-reversal division multiple access technology that uses the environment to provide spatial filtering, allowing a large number of devices to communicate with the computers simultaneously. Compared to using previous wireless communication technologies, such as Wi-Fi or Bluetooth, time-reversal division multiple access has the advantage that the additional cost for enabling each device to communicate with the computer (or controller) is small because the device itself does not need to perform complicated signal processing. Most of the signal processing is performed at the computer (or controller). The power consumption by each device for enabling wireless communication is also much smaller compared to previous wireless technologies.

Because the signals are transmitted through multiple propagation paths having various propagation lengths, there may be a large delay spread, and it may be possible for the computer to receive the tail end of the signal of an earlier symbol and the front end of a later symbol at the same time, resulting in inter-symbol interference. During an uplink cycle, multiple devices may transmit signals to the computer at the same time, so the computer may receive a combined signal having components from several devices. The time-reversal system may use signature waveforms associated with each device to identify the signal components for each device. After using the signature waveforms as a filtering mechanism to identify individual signal components, there may still be interference among signals from different devices. To increase the accuracy of communication, the computer may perform signal processing to cancel inter-symbol interference and/or inter-user interference.

Compared to previous multi-carrier techniques used to reduce inter-symbol interference, such as orthogonal frequency-division multiplexing (OFDM) or orthogonal frequency-division multiple access (OFDMA), the time-reversal divisional multiple access technology leverages the unique temporal and spatial focusing effects of the time reversal phenomenon to provide cost-effective single-carrier broadband multi-user communication.

The time-reversal division multiple access scheme uses the multi-path channel profile associated with each user's location as a location-specific signature for the user. Each path of the multi-path channel can be treated as a virtual antenna in the time-reversal division multiple access system, which collectively results in very high-resolution spatial focusing with potentially "pin-point" accuracy. Meanwhile, the temporal focusing effect can effectively suppress inter-symbol interference which significantly simplifies the terminal user's complexity and gives rise to higher-speed data transmission.

For example, a swarm of robots and/or unmanned aerial vehicles (drones) can communicate wirelessly with each other using time-reversal division multiple access technology. For example, some of the robots and/or drones can function as controllers that perform more complicated signal processing, while the other robots and/or drones function as terminal devices that do not need to perform the complicated signal processing, For rescue robots working in disaster situations, such as in partially collapsed buildings or underground tunnels, multi-path interference may be especially severe for conventional wireless technologies based on, e.g., Wi-Fi or Bluetooth. The multiple signal paths can be used advantageously by time-reversal division multiple access technology, in which the environment provides spatial filtering. For small aerial drones that have small batteries or use solar power, reducing the energy required for wireless communication will allow the energy to be used elsewhere, such as increasing the flight time of the drones.

For example, wearable devices can communicate wirelessly with each other and/or with a controller using time-reversal division multiple access technology. For example, wearable energy generating devices (such as piezoelectric power generators) can be integrated into clothing and/or shoes, and used to provide power to sensors that monitor body parameters. For example, the sensors can be used to measure respiratory patterns, heart beat patterns, walking/running patterns, and/or sleeping patterns. The sensors can wirelessly send measured data to a controller (e.g., smart phone or computer) that processes the collected data. The processed data can be presented in a user-friendly graphical interface. Because time-reversal division multiple access technology requires very little power, the wearable sensors can be powered by the energy generated by the movements of the body (e.g., using piezoelectric components). In some examples, the wearable energy generating devices charge a rechargeable battery, which in turn powers the sensors. In that case, use of time-reversal division multiple access technology removes the requirement to recharge the battery through external power sources, or increases the time duration between recharging. Because time-reversal division multiple access technology requires less power than other communication technologies such as Wi-Fi or Bluetooth, there may be less side effects on the human body due to exposure to electromagnetic signals.

A smart watch may communicate with a mobile phone using time-reversal division multiple access technology. The mobile phone may function as a base station and the watch may function as a terminal device. Because time-reversal division multiple access technology requires less power than other communication technologies such as Wi-Fi or Bluetooth, the watch may spend less power on communicating with the mobile phone and the duration between battery charging may be increased.

In the following description, section 1 provides an overview of the time-reversal technology, section 2 describes a system architecture for time-reversal system, and section 3 describes a time-reversal communication system that uses joint waveform design and interference pre-cancellation.

1. Time-Reversal Technology

The following provides an overview of a time-reversal system. Referring to FIG. 1, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multipath signal. As the signal travel through the propagation paths, the signal may become distorted. The multipath signal received by the second device 110 can be quite different from the signal transmitted by the first device 108.

Figure 2A:
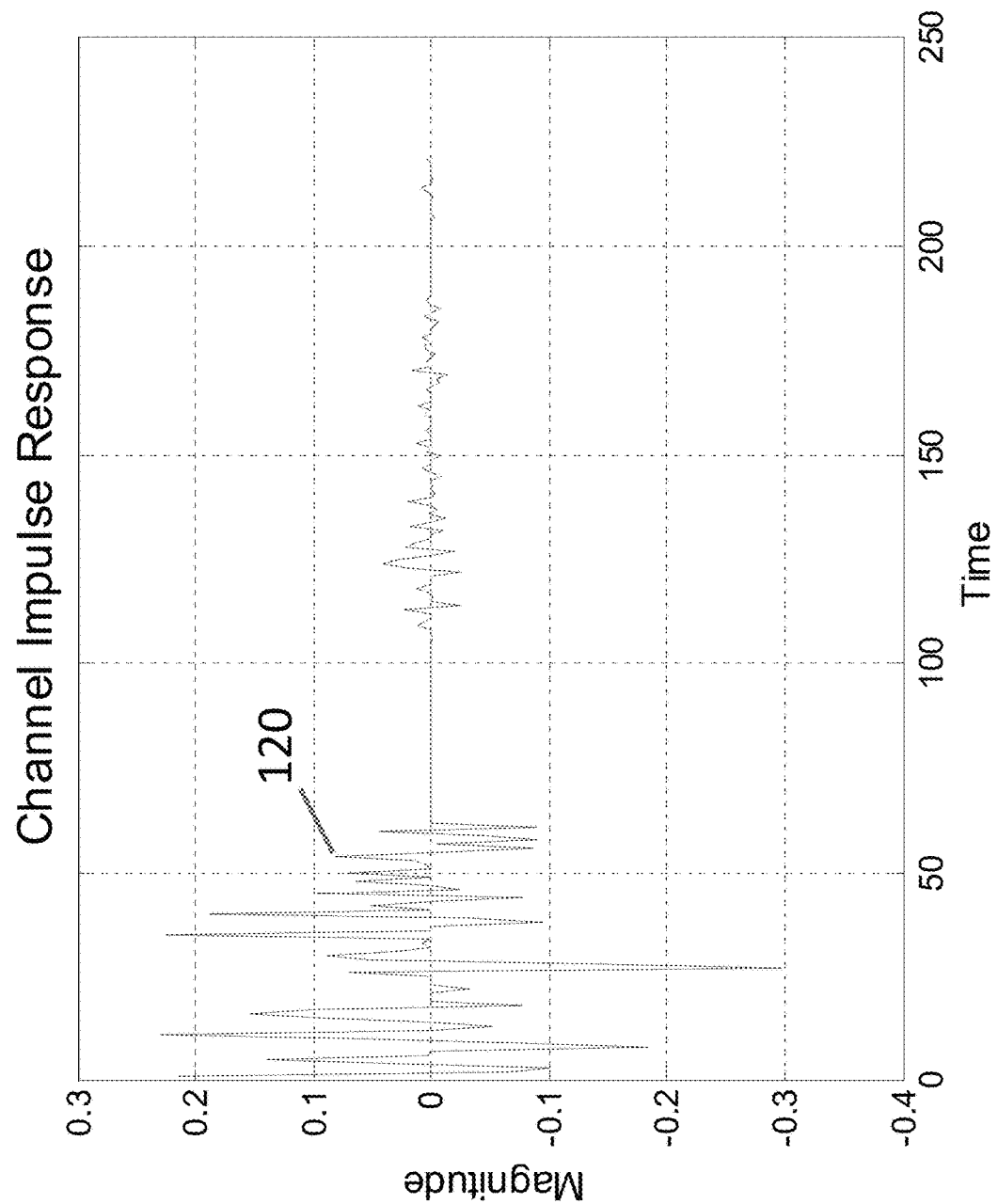
FIG. 2A is a graph of an exemplary recorded channel impulse response waveform.

For example, referring to FIG. 2A, when the first device 108 sends a pulse signal, the signal received by the second device 110 may have a waveform 120. The waveform 120 is referred to as the channel impulse response signal.

Figure 2B:
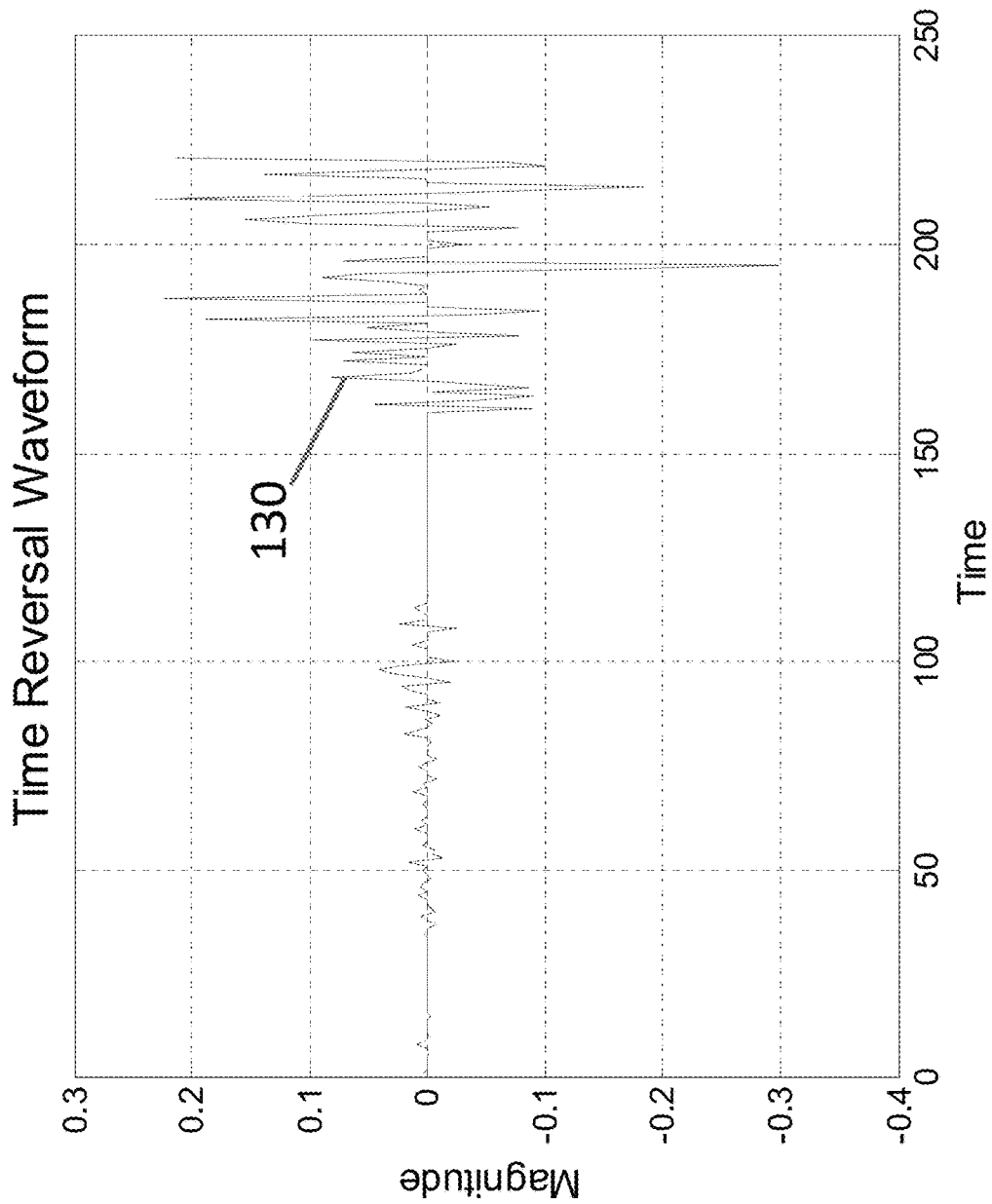
FIG. 2B is a graph of an exemplary time-reversed waveform generated by reversing the waveform of FIG. 2A with respect to time.

Referring to FIG. 2B, a time-reversed waveform 130 can be generated by reversing the waveform 120 with respect to time. If the second device 110 sends a signal having the waveform 130, the signal will propagation in various directions, including through propagation paths 112, 114, and 116 (in reverse direction relative to the propagation direction of the impulse signal), and reach the first device 108. The multipath signal received at the first device 108 may form an impulse signal that is similar to the impulse signal previously sent from the first device 108 to the second device 110.

The waveforms 120 and 130 shown in FIGS. 2A and 2B are merely examples. The waveforms in time-reversal systems can vary depending on, e.g., the environment and the information or data being transmitted. In addition, the initial signal sent from the first device 108 can be any sort of signal, of which an impulse is just one example. The initial signal can be any waveform.

When the second device 110 intends to transmit a data stream to the first device 108, the second device 110 may use a normalized time-reversed conjugate of the signal received from the device 108 as a basic transmission waveform. The second device 110 may encode the data stream on the basic waveform and transmit the signal through the wireless channel. The signal received at the device 108 may be described as the convolution of the transmitted signal and the channel impulse response, plus additive white Gaussian noise. Because the transmitted signal has been designed based on a time reversed version of the channel impulse response, the first device 108 may only need to perform a simple adjustment to the received signal and down-sample it to recover the data stream transmitted by the second device 110.

In some examples a transmitting device or base station or access point may send signals to two or more receiving devices at the same time. The transmitted signals travel through multiple propagation paths to each receiver. Because the receivers are positioned at different locations, the multipath signals travel through different propagation paths to reach the receivers. By carefully constructing the waveform of the signal sent from the transmitter, it is possible to allow each receiver to receive data intended for the receiver with sufficiently high quality.

Figure 3:
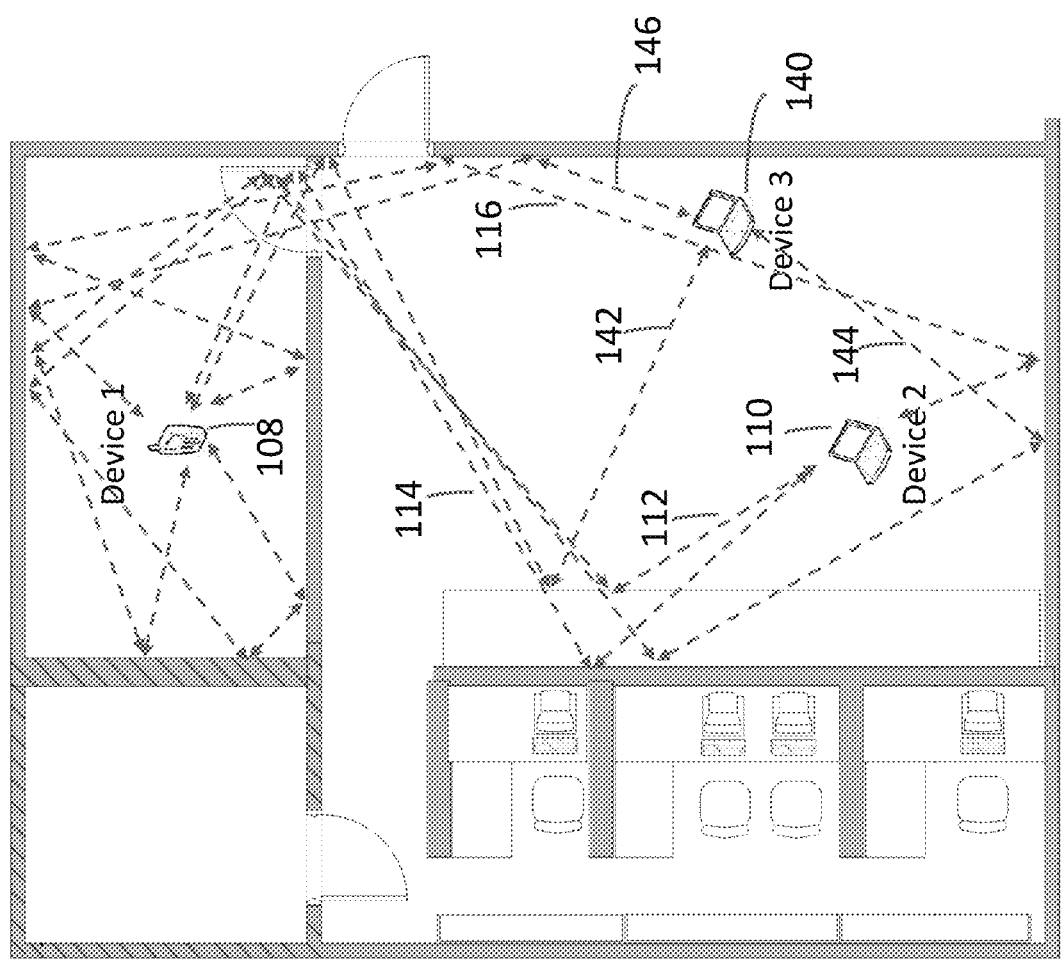
FIG. 3 is a diagram showing an exemplary environment for operating a time-reversal system having multiple receivers.

Referring to FIG. 3, the first device 108 may communicate with the second device 110 and a third device 140. The second device 110 may send a probe signal that travels through propagation paths 112, 114, and 116 to the first device 108. The probe signal can be, e.g., a pulse signal, a signal that has a predetermined waveform, or a signal that includes symbols. The first device 108 may record the received waveform representing the channel response for a first multipath channel. The third device 110 may send a probe signal that travels through propagation paths 142, 144, and 146 to the first device 108. The first device 108 may record the received waveform representing the channel response for the second multipath channel.

The first device 108 constructs a downlink signal based on a first time-reversed multipath channel response, a second time-reversed multipath channel response, a first data stream intended for the second device receiver 110, and a second data stream intended for the third device receiver 140. The first device 108 may transmit the downlink signal so that a first portion of the downlink signal travels through propagation paths 112, 114, and 116 to reach the second device 110. A second portion of the downlink signal may travel through propagation paths 142, 144, and 146 to reach the third device 140. The first signal portion received at the second device 110 may form a first data stream. The second signal portion received at the third device 140 may form a second data stream.

In the example of FIG. 3, the device operating as a transmitter may use either an omnidirectional antenna or a directional antenna for broadcasting the downlink signal, as long as the downlink signal reaches each of the receivers through multiple propagation paths. In some systems, the transmitting antenna may use beam-forming techniques to launch a signal that undergoes a large number of reflections. That is, the transmitter may launch a wireless signal that preferentially experiences multiple transmission paths.

In some examples, a multiple input multiple output (MIMO) system may be used in which the device operating as a transmitter has multiple transmit antennas, and each of the devices operating as a receiver has multiple receive antennas. In some systems, the MIMO transmitting antennas may launch signals that undergo a large number of reflections. That is, the transmitter may launch a wireless signal that preferentially experiences multiple transmission paths.

2. System Architecture

A time-reversal division multiple access architecture has two parts, the downlink part and the uplink part. In a time-reversal division multiple access downlink system, a base station (BS) transmits multiple data streams to several users simultaneously, in which each user is associated with a unique multi-path profile in rich-scattering environments. The time-reversal division multiple access downlink scheme exploits the spatial degrees of freedom of the environment and focuses the useful signal power mostly at the intended locations. Time reversal mirrors (TRMs) at the base station first time-reverse the channel response of each user's channel as the user's signature waveform, and then embed these signatures into the corresponding data streams. The transmitted signal from the base station in the time-reversal division multiple access downlink is a mixed signal that includes the data intended to be sent to several users (including different data intended for different users). When the combined signal propagates to a certain user through the corresponding multipath channel, a large number of multi-path signals having identical phases will automatically resonate at this user's location, resulting in the spatial focusing of the power of the useful signal component that carries this user's data.

Within the time-reversal division multiple access framework, more sophisticated signature waveforms than the basic time-reversal waveform can be derived based on the multi-path channel responses to further improve the performance of the time-reversal division multiple access downlink system, when additional computational complexity is affordable at the base station. One desirable feature of the time-reversal division multiple access downlink scheme is that most of the complexity in communication can be shifted to the base station side, facilitating low complexity in communication components at the end-users.

A time-reversal division multiple access uplink scheme can be implemented in which the terminal devices have low complexity communication components. The time-reversal division multiple access uplink scheme shares a strong duality in the mathematical structure with the downlink without increasing the complexity of the end-users. A virtual spatial focusing effect can be observed in the user's signature domain at the base station. Similar to that of the downlink scheme, the virtual spatial focusing effect enables the base station to use the user's time-reversal signature waveform to extract the useful component from the combined received signals, allowing multiple users accessing the base station simultaneously. Additionally, unlike many other conventional communications paradigms that adopt symmetric architectures, the uplink scheme shares the same processing power and channel knowledge at the base station with the downlink, allowing the end-user's communication component to have a low complexity.

Figure 4:
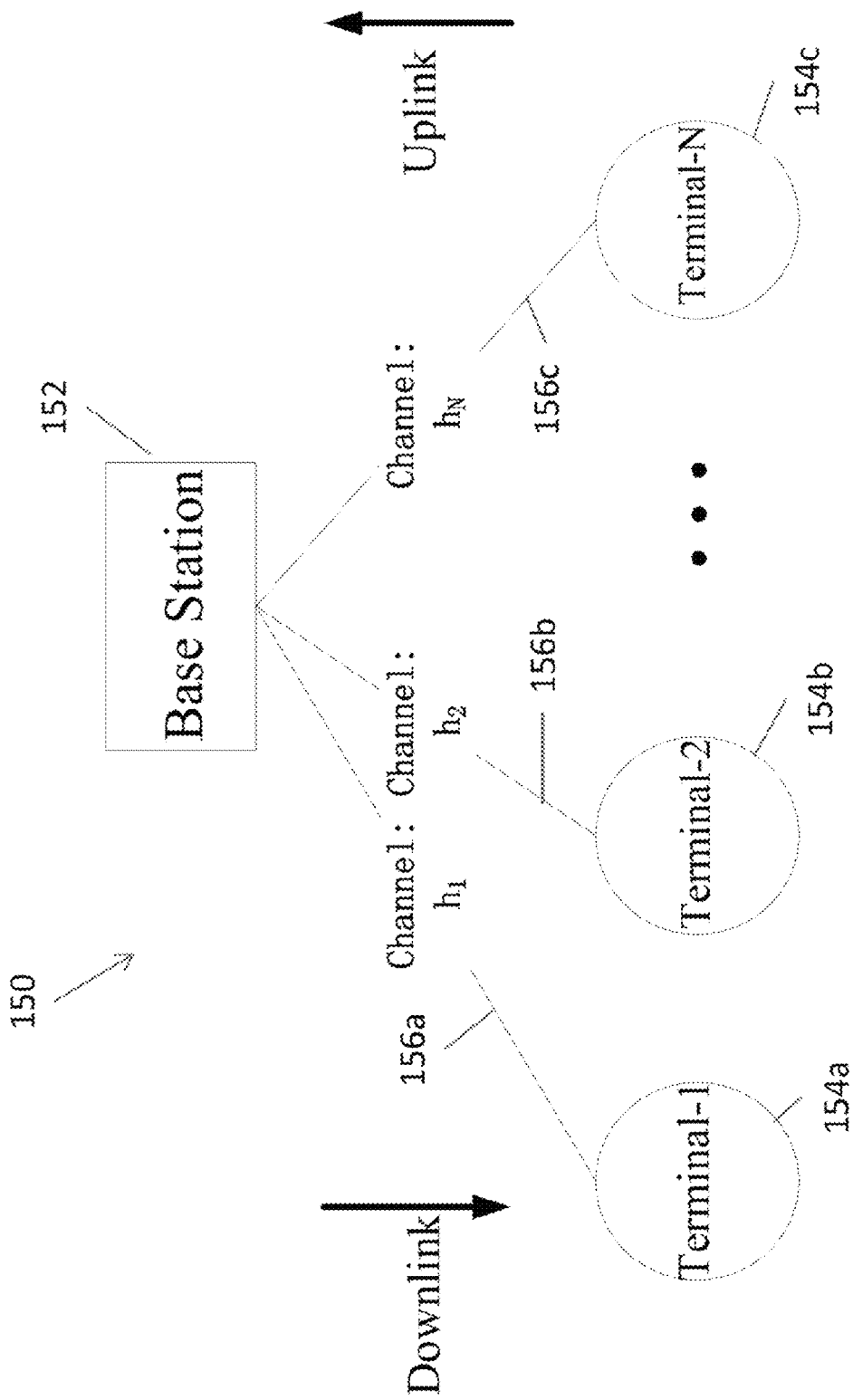
FIG. 4 is a diagram of an exemplary multi-user time reversal communication system.

Referring to FIG. 4, an exemplary multi-user time reversal communication system 150 includes a base station (BS) 152 and multiple terminal devices (e.g., 154a, 154b, 154c, collectively 154). Each of the terminal devices 154 is associated with a multipath wireless channel (e.g., 156a, 156b, 156c, collectively 156) between itself and the base station 152. Each multipath wireless channel 156 in the figure represents two or more multiple signal propagation paths between the corresponding terminal and the base station. In some implementations, all the devices (including the base station 152 and the terminals 154) can operate at the same frequency band. For the downlink, the base station 152 can send multiple messages (either independent or non-independent) simultaneously to multiple selected terminals 154. For the uplink, multiple terminals 154 can send their own messages to the base station 152 simultaneously.

Hand-Shake Process

The following describes an exemplary hand-shaking process between the base station 152 and the terminals 154.

Figure 5:
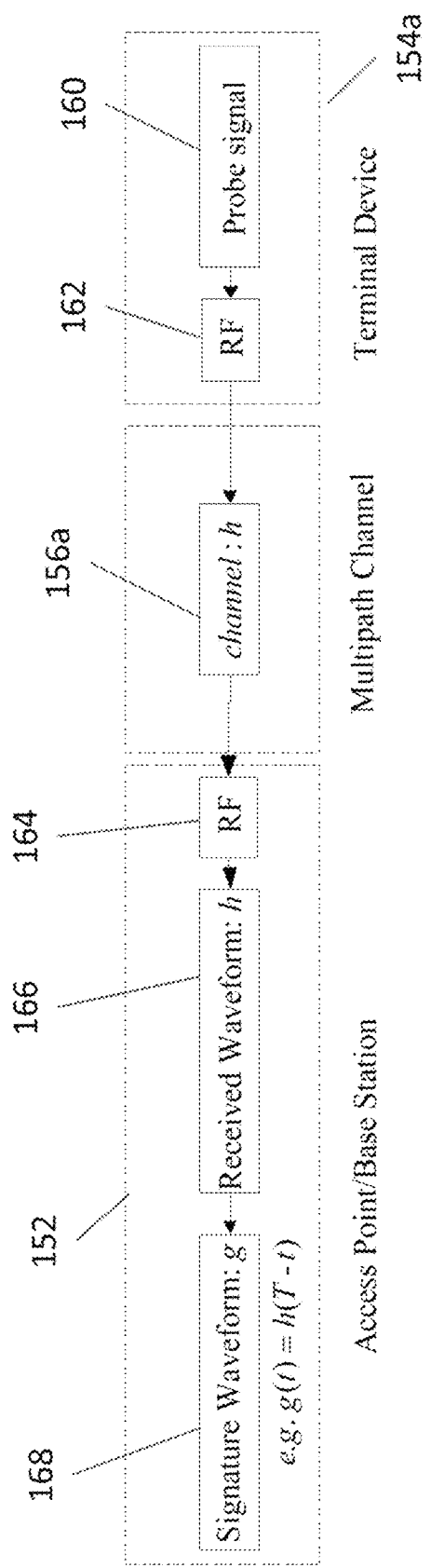
FIG. 5 is a diagram of an exemplary hand-shaking process.

Referring to FIG. 5, in some implementations, after each terminal device 154 registers with the base station 152, a hand-shaking process may occur periodically in a round-robin manner among the registered terminal devices 154 to maintain an up-to-date record of the channel responses associated with the terminal devices 154 at the base station 152.

During the hand-shaking process, at a given time, only one selected terminal, e.g., 154a, may send a probe signal 160, and may perform radio frequency modulation 162 to produce a radio frequency signal that propagates through the associated multi-path channel 156a to the base station 152. The probe signal 160 can be, e.g., a pulse signal, a signal that has a predetermined waveform, or a signal that includes symbols to enable the base station to perform synchronization and/or other functions. In the examples below, the probe signal is a pulse signal. However, other types of probe signals can be used in the system 150. The base station 152 may receive the transmitted radio frequency signal, perform radio frequency demodulation 164 to recover the unique channel response (waveform) 166 and record it. When the selected terminal, e.g., 154a, is performing the hand-shaking process with the base station 152, the other terminals, e.g., 154b and 154c, remain silent. Upon receiving the channel response 166 associated with the terminal 154a, the base station 152 calculates a signature waveform g 168 for the terminal 154a based on its channel response received at the base station 152.

For example, one of the basic signature waveforms for a terminal associated with a channel response h(t) can be h*(T−t), which is a time-reversed waveform of the channel response, with T representing the delay spread of the multi-path channel. If h(t) is a complex value, h*(T−t) is the time reverse and conjugation of the channel response h(t). In the discrete time domain, the channel response can be represented as h[k], and the corresponding signature waveform can be h*[L−k], in which L represents the delay spread of the multi-path channel.

The delay spread can be a measure of the multipath richness of a communications channel. In general, it can be interpreted as the difference between the time of arrival of the earliest significant multipath component (typically the line-of-sight component) and the time of arrival of the latest multipath component. For the discrete time model, by the definition of delay spread, when the delay spread is L, the total channel length is L+1.

The system 150 can use any type of waveform design that is designed for a variety of performance metrics, such as designed for reducing or minimizing inter-symbol interference and/or inter-user interference.

After the hand-shaking process, the calculated signature waveforms can be used for data transmissions during both the downlink and the uplink processes. Techniques for time-reversal handshaking is described in U.S. patent application Ser. No. 14/183,648, titled "Handshaking Protocol For Time-Reversal System," filed on Feb. 19, 2014, the contents of which are incorporated by reference in their entirety.

The time reversal communication system 150 has many advantages. The system 150 leverages the multipath channel as a matched filter, i.e., harvesting energy from the scattering environment, so it is highly energy efficient. Moreover, because the receiver only needs to sample at the particular time instant without sophisticated processing to obtain the useful information, the receiver is easy to implement, so that the computational complexity at the receiver can be low.

3. Time-Reversal Communication System with Joint Waveform Design and Interference Pre-Cancellation 3.1 Overview In a basic time-reversal communication system, a time-reversed channel impulse response that functions as the transmit waveform can increase the signal strength in a large delay spread channel in broadband communication. After the transmitted time-reversal waveform convolves with the multi-path channel, the temporal focusing effect of the time-reversal waveform re-collects a large percentage of the signal energy in a single tap. Using channel reciprocity, the time-reversed waveform is essentially a matched-filter that facilitates improved performance by its capability of increasing the signal-to-noise ratio (SNR). The time-reversal transmission technique requires low complexity at the receiver because a simple one-tap symbol estimation is performed. The time-reversal transmission techniques can provide energy-efficient and low-complexity green wireless communication.

In high speed wideband communication systems, when the symbol duration is smaller than the channel delay spread, the symbol waveforms overlap and interfere with each other. When the symbol rate is high, such inter-symbol interference can be severe and causes performance degradation. Further, in multi-user downlink scenarios, the time-reversal base-station uses each user's particular channel response as the user's symbol waveform (signature waveform) to modulate the symbols intended for that user. The signature waveforms for different users may not be orthogonal to each other, so the symbols intended for different users may interfere with one another when transmitted concurrently, reducing the performance of time-reversal transmission.

In a wideband environment, substantial degrees of freedom are available when designing the transmitted waveforms to reduce interference. Based on design criteria such as system performance, quality-of-service (QoS) constraints, or fairness among users, the waveform design can be formulated as an optimization problem with the transmitted waveforms as the optimization valuables. In waveform design, the amplitude and phase of each tap of the waveform are adjusted based on the channel information, such that after convolving with the channel, the received signal at the receiver retains most of the intended signal strength and rejects or suppresses the interference as much as possible. In some examples, the mathematical structure of waveform design can be analogous to that of the precoder design in multiple-input single-output (MISO) systems, since the taps in waveform design act as the beamforming coefficients of the transmit antenna in the precoder design.

Besides the channel information, another important side information the transmitter can exploit in the waveform design is the transmitted symbol information. In some implementations, if the receiver interference is known to the transmitter, it is possible to remove or reduce the interference by coding techniques. The interference can be known to the transmitter since it can be derived from the transmit waveforms, the multipath channels, and the information bits. For example, in a single-user scenario, when a signal arrives at the receiver, the waveform of a symbol induces inter-symbol interference to the previous symbols as well as the later symbols. Given the transmitted symbols, the causal part of inter-symbol interference can be cancelled in advance in designing the waveform of the current symbol. In some implementations, for time-reversal communication systems, the causal part of interference can be cancelled or reduced, while the anti-causal part of interference can be suppressed by the waveform design based on the channel information.

In the following, we describe a time-reversal communication system that uses joint waveform design and interference pre-cancellation. The single-user scenario permits a closed-form solution of the joint waveform design. The resulting design can pre-cancel the causal inter-symbol interference and suppress the anti-causal inter-symbol interference. For the multi-user scenario, similarly the interference (inter-symbol interference and inter-user interference) can be categorized into causal interference and anti-causal interference. The pre-cancellation filter design can be determined after the multi-user waveform design is completed. The resulting multi-user waveform design is non-convex, and iterative algorithms or processes can be used to suboptimally tackle the optimization problem. Two of those processes are described below. The first process is based on alternating optimization, and the second process is a gradient method. Both iterative processes converge to the local optimal solutions. Numerical simulations have been conducted to validate the convergence behavior of the iterative algorithms and demonstrate the performance of the joint design.

In the following, a description of the system model of the time-reversal communication system is provided. The joint waveform design and interference pre-cancellation for the single-user scenario is described, followed by the multi-user scenario, where the two iterative algorithms are described. Simulation results are shown to demonstrate the performance.

3.2 System Model

In the basic time-reversal system, a user periodically sends a known sequence of waveforms to the base-station, which then estimates the channel impulse response using the received signal. Based on the channel impulse response, the base-station uses the time-reversed version of the channel as the symbol waveform to transmit data symbols. After receiving the signal, the user estimates the transmitted symbol by looking at one sample of the received signal for each symbol. As a consequence, the complexity at the user end can be low while most of the computational burden is shifted to the base-station.

In the following, for simplicity of discussion, perfect channel estimation and perfect synchronization are assumed. The same principles can be extended to the more general cases in which channel estimation and timing synchronization are not entirely perfect.

Figure 6:
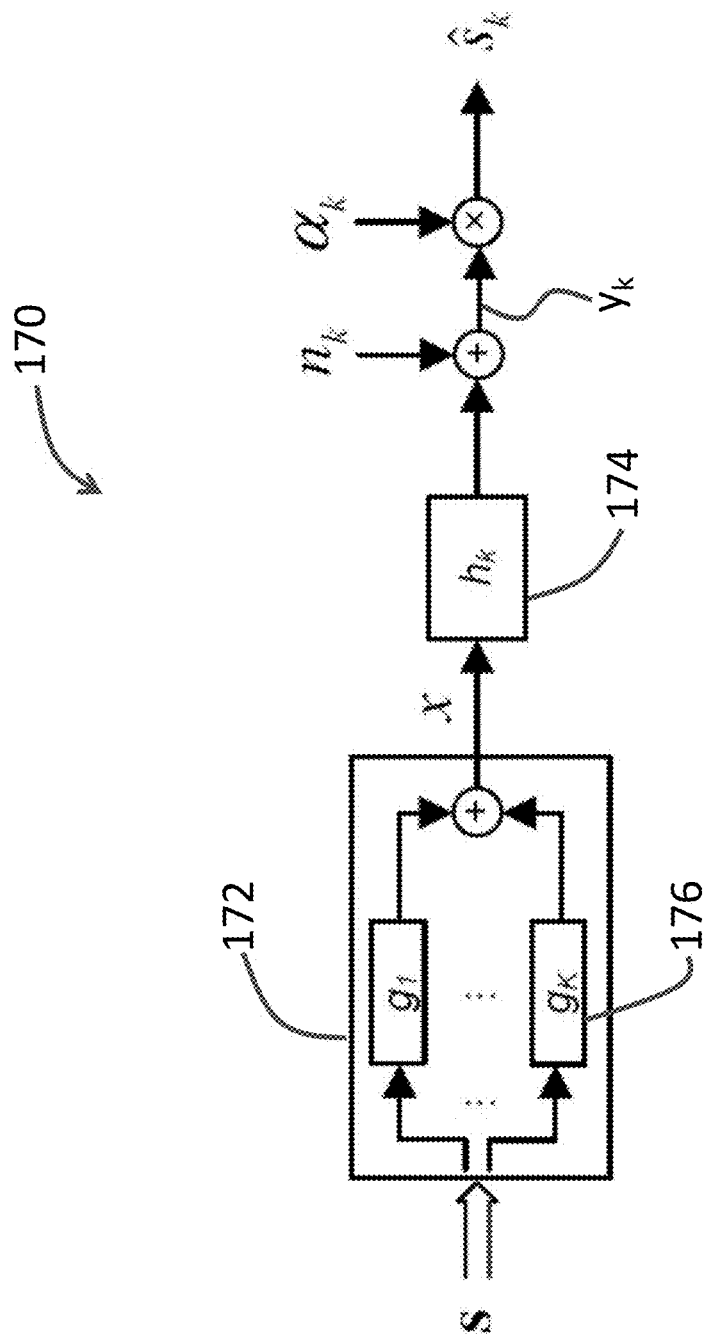
FIG. 6 is a diagram of a portion of an exemplary multi-user downlink time-reversal system.

Referring to FIG. 6, in some implementations, a multi-user downlink time-reversal system 170 includes a base-station 172 and K users. Only one of the channels and the corresponding transmission signal are shown in the figure. The multipath channel 174 between the base-station 172 and the k-th user is denoted by $h_k$, a column vector of L elements where L is the maximum channel length among the K channels. Let $s_k$ denote an information symbol and $g_k$ 176 be the signature waveform associated with user k. The signature waveform can be a basic time-reversal waveform or a more advanced waveform. The length of $g_k$ is also L. The received signal $y_k$ at user k is given by $$y_k = H_k \sum_{j=1}^{K} g_j s_j + n_k, \quad \text{(Equ. 1)}$$

where $H_k$ is the Toeplitz matrix of size $(2L-1) \times L$ with the first column being $[h_k^T \, 0_{1 \times (L-1)}]^T$, and $n_k$ denotes the additive white Gaussian noise (AWGN). The user estimates the symbol $s_k$ by scaling the sample $y_k[L]$ by $\alpha_k$, which corresponds to the gain control at the receiver.

Equation 1 represents the received signal when the symbols are transmitted further apart, i.e., with a symbol rate being at most $1/L$ times sampling rate $1/T_s$. When the symbol rate is $1/(DT_s)$ where D denotes the rate back-off factor and D<L, the received waveforms of different symbols overlap with each other and give rise to the inter-symbol interference. Here, D is the rate back-off factor introduced to adjust the symbol rate in time-reversal systems. To characterize the effect of inter-symbol interference, the decimated channel matrix of size $(2L_D - 1) \times L$, where $$L_D = \left\lfloor \frac{L-1}{D} \right\rfloor + 1,$$

is defined as $$\tilde{H}_k = \sum_{i=-L_D+1}^{L_D-1} e_{L_D+i} e_{L+iD}^T H_k, \quad \text{(Equ. 2)}$$

where $e_l$ is the l-th column of a $(2L-1) \times (2L-1)$ identity matrix. Here, $\tilde{H}_k$ is obtained by decimating the rows of $H_k$ by D, i.e., centering at the L-th row, every D-th row of $H_k$ is kept in $\tilde{H}_k$ while the other rows are discarded. The center row index of $\tilde{H}_k$ is $L_D$. Then the sample for symbol estimation can be written as $$y_k[L] = \quad \text{(Equ. 3)}$$
$$\tilde{h}_{kL}^H g_k s_k[L_D] + \tilde{h}_{kL}^H \sum_{j \neq k} g_j s_j[L_D] + \sum_{l=1, l \neq L_D}^{2L_D-1} \tilde{h}_{kl}^H \sum_{j=1}^{K} g_j s_j[l] + n_k[L],$$

where the $\tilde{h}_{kl}^H = e_l^T \tilde{H}_k$ denotes the l-th row of $\tilde{H}_k$, and $s_j[l]$ denotes user j's l-th symbol.

Equation 3 shows that the symbol $s_k[L_D]$, the $L_D$-th symbol of user k, is interfered by the previous $L_D - 1$ symbols and the later $L_D - 1$ symbols, as well as other users' $K(2L_D - 1)$ symbols, and also corrupted by the noise. The design of the signature waveforms $\{g_k\}$ has critical influence to the symbol estimation and thus the system performance. In some examples, if the basic time-reversal waveforms are adopted, i.e., $g_k = \tilde{h}_{kL}$, then the intended signal power for each user is maximized but without considering the interference caused by other symbols. As such, the performance is limited by the interference when the transmit power is high. In some examples, a waveform design uses zero-forcing, which minimizes the interference signal power without taking into account the intended signal power. Thus, the resulting signal-to-noise ratio can be low and may cause performance degradation, e.g., when the transmit power is relatively low. We note that well-designed waveforms can strike a balance between enhancing the intended signal power and suppressing the interference power.

3.3 Single-User Joint Waveform Design and Interference Pre-Cancellation

In this section, we describe the joint waveform design and interference pre-cancellation for the single-user case, which allows a closed form solution and provides an insight to the joint design in the multi-user scenario. To simplify the notations, the user index for the single-user scenario is omitted. For example, the channel, the signature waveform, and the gain are denoted as h, g, and $\alpha$, respectively. In some examples, a waveform can be designed to suppress the inter-symbol interference by designing the signature waveform g based on the criterion of maximizing the signal-to-interference-plus-noise ratio (SINR). Such a formulation may involve solving an eigenvalue problem.

In the following, we describe a process in which reducing or minimizing mean-square error (MSE) is the design criterion. In the single-user case, a closed form solution to the joint design can be derived, and the minimum mean-square error waveform without interference pre-cancellation also achieves the maximum signal-to-interference-plus-noise ratio. We first discuss the waveform design for minimizing mean-square error without interference pre-cancellation, then discuss the pre-cancelling filter design. Finally, the joint waveform design and interference pre-cancellation is analyzed and the closed form solution is provided.

3.4 Waveform Design without Interference Pre-Cancellation

The estimated symbol can be obtained by scaling the sample y[L] by the gain $\alpha$, i.e., $\hat{s}[L_D]=\alpha y[L]$. Let the l-th row of the decimated channel matrix H be denoted by $h_l^H$. The estimation mean-square error defined as $E[\|\hat{s}[L_D]-s[L_D]\|^2]$ can be expressed as $$MSE(\alpha, g) = E[\|\alpha y[L] - s[L_D]\|^2] \quad \text{(Equ. 4)}$$

$$= E\left[\left\|(\alpha h_{L_D}^H g - 1)s[L_D] + \alpha n[L] + \sum_{l=1, l\neq L_D}^{2L_D-1} h_l^H g s[l]\right\|^2\right]$$

$$= |\alpha h_{L_D}^H g - 1|^2 P_S + \sum_{l=1, l\neq L_D}^{2L_D-1} |\alpha h_l^H g|^2 P_S + |\alpha|^2 P_N,$$

where s[l], l=1, . . . , $L_D$-1, $L_D$+1, . . . , $2L_D$-1, denote the interfering symbols transmitted adjacent to the intended symbol s[$L_D$]. The symbol power $P_S=E[\|s[l]\|^2]$, $\forall l$, is assumed to be unity for normalization. The noise can have an independent and identically distributed (i.i.d.) Gaussian distribution and hence $P_N=E[\|n[l]\|^2]$, $\forall l$. To derive the minimum mean-square error waveform g, we formulate the problem as minimizing mean-square error subject to a power constraint $g^H g=P_{max}$ to rule out the trivial solution g=0, the all-zero vector. The Lagrangian function is given by $$L(\alpha,g,\lambda)=MSE(\alpha,g)+\lambda(g^H g-P_{max}). \quad \text{(Equ. 5)}$$

The optimization problem is nonconvex, and hence the Karush-Kuhn-Tucker (KKT) conditions are necessary but may not be sufficient for the global optimal solution. However, it can be shown that the solution to the Karush-Kuhn-Tucker conditions is unique, which means the unique solution is the global optimal solution. Taking the derivative of L with respect to g and $\alpha$, respectively, we have $$\frac{\partial L}{\partial \alpha} = 0 \Rightarrow \alpha = \left(\sum_{l=1}^{2L_D-1} |h_l g|^2 + P_N\right)^{-1} g^H h_{L_D}, \quad \text{(Equ. 6)}$$

and $$\frac{\partial L}{\partial g} = 0 \Rightarrow g = \alpha^*\left(\sum_{l=1}^{2L_D-1} |\alpha|^2 h_l h_l^H + \lambda I\right)^{-1} h_{L_D}, \quad \text{(Equ. 7)}$$

where $(\bullet)^*$ denotes conjugation. From Equation 7, we have $$\alpha^* g^H h_{L_D} = g^H \left(\sum_{l=1}^{2L_D-1} |\alpha|^2 h_l h_l^H + \lambda I\right) g. \quad \text{(Equ. 8)}$$

Also from Equation 6, we have $$g^H h_{L_D} = \alpha g^H \left(\sum_{k=1}^{2L-1} h_k h_k^H + \frac{P_N}{P_{max}} I\right) g \quad \text{(Equ. 9)}$$

Thus, by comparing Equations 8 and 9, we can solve the Lagrangian multiplier $$\lambda = |\alpha|^2 \frac{P_N}{P_{max}}.$$

Substituting $\lambda$ into Equation 7 and using the power constraint $g^H g=P_{max}$, we obtain the following:

$$\alpha^{SU} = \sqrt{P_{max}^{-1} h_{L_D}^H \left(\sum_{l=1}^{2L_D-1} h_l h_l^H + \frac{P_N}{P_{max}} I\right)^{-2} h_{L_D}}, \quad \text{(Equ. 10)}$$

where the superscript SU denotes the single-user scenario. Substituting $\lambda$ and Equation 10 into Equation 7, we can obtain the optimal waveform $$g^{SU} = \alpha^{SU-1}\left(\sum_{l=1}^{2L_D-1} h_l h_l^H + \frac{P_N}{P_{max}} I\right)^{-1} h_{L_D}. \quad \text{(Equ. 11)}$$

The resulting minimum mean-square error in the time-reversal system is given by $$MSE^{SU} = 1 - h_{L_D}^H \left(\sum_{l=1}^{2L_D-1} h_l h_l^H + \frac{P_N}{P_{max}} I\right)^{-1} h_{L_D}. \quad \text{(Equ. 12)}$$

The phase of α can be chosen arbitrarily without altering the mean-square error. Therefore, we choose a real-valued $\alpha^{SU}$ as in Equation 10. From the derivation above, we can obtain the closed-form solution to the waveform design without interference pre-cancellation given the channel matrix and the signal power to noise power ratio.

3.5 Interference Pre-Cancellation

In some implementations of the time-reversal system, a user estimates the intended symbol by the sample of the central peak of the receive signal. Therefore, the inter-symbol interference can be identified as two parts: the causal inter-symbol interference and the anti-causal inter-symbol interference. Due to the overlapping of the received signals of consecutive symbols, one symbol can have influence to the previously transmitted symbols and also to the later transmitted symbols. To compensate for the interference caused by the previous symbols, the current symbol can be subtracted by the interference before convolving with the signature waveform, that is, $$v[k] = s[k] - \left(h_{L_D}^H g\right)^{-1} \sum_{l=1}^{L_D-1} \left(h_{L_D+l}^H g\right) v[k-l]. \quad \text{(Equ. 13)}$$

The operation in Equation 13 can be considered as passing the symbols s[•] through a feedback filter $$b^{ZF} = \left(h_{L_D}^H g\right)^{-1} \left[0_{1 \times L_D}, -h_{L_D+1}^H g, \ldots, -h_{2L_D-1}^H g\right],$$

where $0_{1 \times L_D}$ denotes a $1 \times L_D$ zero vector. The resulting mean-square error is then given by $$MSE^{IPC} = |\alpha h_{L_D}^H g - 1|^2 P_V + \sum_{l=1}^{L_D-1} |\alpha h_l^H g|^2 P_V + |\alpha|^2 P_N, \quad \text{(Equ. 14)}$$

where $P_V$, the average power of v[•], usually requires more power than $P_S$ since additional power is needed for the second term in Equation 13 even though the causal interference part $\Sigma_{l=L_D+1}^{2L_D-1} |\alpha h_l^H g|^2$ can be completely cancelled. The benefit of performing interference pre-cancellation can be impaired by the performance degradation caused by the additional power. In some examples, when the noise power is more dominant than the interference power, the interference pre-cancellation may not provide much performance improvement and much of the transmit power may be wasted in performing the pre-cancellation.

The problem of the increase of the transmit power can be resolved by applying Tomlinson-Harashima precoding (THP), which incorporates a modulo-A component after the interference-precancellation at the transmitter, and a modulo-A component before the symbol estimation at the receiver. Referring to FIG. 7A, a system 180 includes a block 182 that performs a modulo-A operation, denoted as $\text{mod}_A(\cdot)$, which subtracts element-wise the nearest integral multiple of A from the input such that each element of the output is in $$\left[-\frac{A}{2}, \frac{A}{2}\right),$$

i.e., for an input v, $$\text{mod}_A(v) = v - A \left\lfloor \frac{v}{A} + \frac{1}{2} \right\rfloor, \quad \text{(Equ. 15)}$$

where $\lfloor \cdot \rfloor$ is the floor operator, which returns the highest integer that is lower or equal to the input value. For a complex value, the modulo-A operator applies to both the real and the imaginary parts independently. With different constellation size of the symbol modulation (e.g., QPSK, 16-QAM, or 64-QAM), the parameter A can be chosen accordingly to minimize the modulo loss which will be explained in detail later.

3.6 Joint Waveform Design and Interference Pre-Cancellation

The output of the modulo-A component 182 is fed back through a feedback filter b 184. The modulo-A component 182 imposes nonlinearity to the design of the feedback filter b 184. The output of the modulo-A component 182 is convolved with the signature waveform g at module 186, resulting in a transmit symbol x that is transmitted through the channel h 188. Noise is added to the received symbol, and at the receiver the symbol is scaled by a gain a. The receiver performs a modulo-A operation at component 189 before estimating the symbol.

Referring to FIG. 7B, the nonlinear part can be moved to the outermost of the system design such that a converted system 190 is equivalent to the original system 180 in FIG. 7A, where a and a' denote integral multiples of A such that the outputs of the modulo components are within the proper range.

We can focus on minimizing the mean-square error of the linear part of the system, i.e., $MSE^{IPC} = E[\|\hat{u} - u\|^2]$, where the superscript IPC denotes interference pre-cancellation, u denotes the symbol after adding a to the original input s, and û is the symbol before adding a' for the estimated symbol ŝ. The mean-square error is given by $$MSE^{IPC}(g, b, \alpha) = |\alpha|^2 \sum_{l=1}^{L_D-1} |h_l^H g|^2 P_V + \quad \text{(Equ. 16)}$$
$$|\alpha h_{L_D}^H g - 1|^2 P_V + \sum_{l=L_D+1}^{2L_D-1} |\alpha h_l^H g - b[l]|^2 P_V + |\alpha|^2 P_N,$$

where $P_V$ is the average power of the modulo output. The first term, $|\alpha|^2 \Sigma_{l=1}^{L_D-1} |h_l^H g|^2 P_V$, is the anti-causal interference caused by the symbols transmitted after the current symbol. The third term, $\Sigma_{l=L_D+1}^{2L_D-1} |\alpha h_l^H g - b[l]|^2 P_V$, is the causal interference caused by the symbols transmitted before the current symbol.

Our goal of the joint waveform design and interference pre-cancellation is to jointly determine the parameters b, g and α such that the mean-square error is minimized. For example, the optimal b[l] can be chosen such that $$b[l] = \begin{cases} \alpha h_l^H g, & l = L_D + 1, \ldots, 2L_D - 1, \\ 0, & \text{otherwise} \end{cases} \quad \text{(Equ. 17)}$$

Substituting Equation 17 into Equation 16 and setting $P_V = 1$ for normalization, we can solve the problem of mean-square error minimization subject to a transmit power constraint by a similar analysis as in Equations 5 to 10. The optimal α and g are given by $$\alpha^{IPC} = \sqrt{P_{max}^{-1} h_{L_D}^H \left( \sum_{l=1}^{L_D-1} h_l h_l^H + \frac{P_N}{P_{max}} I \right)^{-2} h_{L_D}}, \quad \text{(Equ. 18)}$$

$$g^{IPC} = \alpha^{-1} \left( \sum_{l=1}^{L_D-1} h_l h_l^H + \frac{P_N}{P_{max}} I \right)^{-1} h_{L_D} \quad \text{(Equ. 19)}$$

The resulting minimum mean-square error is given by $$MSE^{IPC} = 1 - h_{L_D}^H \left( \sum_{l=1}^{L_D-1} h_l h_l^H + \frac{P_N}{P_{max}} I \right)^{-1} h_{L_D}. \quad \text{(Equ. 20)}$$

Examining the difference between Equations 11 and 19, we can see that $g^{IPC}$ takes into account the anti-causal inter-symbol interference, which includes the 1st to the $(L_D-1)$-th rows of the decimated channel matrix H. The causal inter-symbol interference, i.e., the $(L_D+1)$-th to the $(2L_D-1)$-th rows, are not considered in $g^{IPC}$ since they can be pre-cancelled by the feedback filter b 184. The difference between the resulting minimum mean-square-errors in Equations 12 and 20 also demonstrates such an effect.

The design of the optimal parameters can be summarized as follows. First, the receiver gain $\alpha^{IPC}$ is determined by Equation 18. Then the waveform $g^{IPC}$ is designed to suppress the anti-causal interference using Equation 19 given $\alpha^{IPC}$. Finally, the coefficients of the feedback filter b for interference pre-cancellation is obtained by Equation 17 given $g^{IPC}$ and $\alpha^{IPC}$.

3.7 Bit Error Rate Analysis

The performance of the joint waveform design and interference pre-cancellation can be analyzed by considering several losses of incorporating the Tomlinson-Harashima precoding, including power loss, modulo loss, and shaping loss. The power loss is due to the modulo output still requiring higher power $P_V$ than the symbol power $P_S$. Since the modulo operation changes the constellation to be repeated over the whole space and such a change shrinks the decision region of those symbols at the boundary of the constellation, when those boundary symbols are transmitted, the received symbols may be misinterpreted as wrong symbols and modulo loss occurs. The shaping loss happens when the distribution of the transmit signal becomes non-Gaussian because theoretically the optimal input distribution is Gaussian while the modulo operation generally produces a uniform distributed signal. In the time-reversal system, the output of the modulo operation is passed through the transmit waveform (or signature waveform), which considerably randomizes the distribution and tends to give rise to a Gaussian-like distribution. Hence, in the following analysis, we neglect the shaping loss and focus on the power loss and modulo loss.

The output of the modulo operation is uniformly distributed when the interference to be pre-cancelled is large enough. Considering both in-phase and quadrature components of v[•], we can have $$P_V = \frac{2A^2}{3},$$

where A is the modulo operation size. The optimal choice of A depends on the constellation size. For example, $A=\sqrt{2}$ for QPSK and the power loss is $4/3 \approx 1.25$ dB. As discussed above, the modulo loss occurs when the boundary symbols are transmitted, and thus depends on the constellation size. The bit error rate for QPSK can be approximated by $$P_b^{QPSK} \approx 2Q\left( \sqrt{\frac{\frac{1}{\sqrt{2}} P_{loss}^{-1}}{P_{ISI} + \sigma^2}} \right) - \quad \text{(Equ. 21)}$$

$$Q\left( 3\sqrt{\frac{\frac{1}{\sqrt{2}} P_{loss}^{-1}}{P_{ISI} + \sigma^2}} \right) + Q\left( 5\sqrt{\frac{\frac{1}{\sqrt{2}} P_{loss}^{-1}}{P_{ISI} + \sigma^2}} \right) - \ldots,$$

where $P_{ISI} = P_V \Sigma_{l=1}^{L_D-1} |h_l^H g|^2$. For higher order constellation such as 16-QAM or 64-QAM, the analysis can be derived in a similar manner.

3.8 Multi-User Joint Waveform Design and Interference Pre-Cancellation

In the joint waveform design and interference pre-cancellation for the single-user time-reversal system, the causal inter-symbol interference is pre-cancelled by the feedback filter and anti-causal inter-symbol interference is suppressed by the waveform design. In the multi-user downlink time-reversal system, pre-cancelling can be applied to both the causal inter-symbol interference and the causal inter-user interference by feedback filters, and the anti-causal inter-symbol interference and the anti-causal inter-user interference can be suppressed by multi-user waveform design.

FIG. 8A shows a block diagram of an exemplary multi-user time-reversal system 200 with interference pre-cancellation. The wide arrows represent the flow of a vector of data streams as extensions of those shown in FIG. 7A. The feedback filter 202 receives a vectored input and produces a vectored output. In the waveform part, each data stream is convolved with its signature waveform $g_k$ 204 and the outputs are additively aggregated together at component 206 to be the transmit signal x. FIG. 8B shows a converted system 210 that is equivalent to the system 200.

To determine the causality of inter-user interference and inter-symbol interference, the ordering of users for interference pre-cancellation has to be settled. Notice that all users' signals are transmitted simultaneously and the causality of users is determined by the ordering of inter-user interference cancellation. Finding the optimal ordering may require exhaustive search over all possible permutations. As will be described later, the overhead of searching may not be worth the effort since the amount of interference with different orderings differs only in the current symbols, which contribute a relatively small portion to the overall interference. In the following, we denote the index of a user as its ordering. For user k's $L_D$-th symbol, $s_k[L_D]$, the causal interference is caused by the symbols including $\{s_j[l], l<L_D, \forall j\}$ and $\{s_j[L_D], j<k\}$; the anti-causal interference is caused by the symbols $\{s_j[l], l>L_D, \forall j\}$ and $\{s_j[L_D], j>k\}$.

Figure 9:
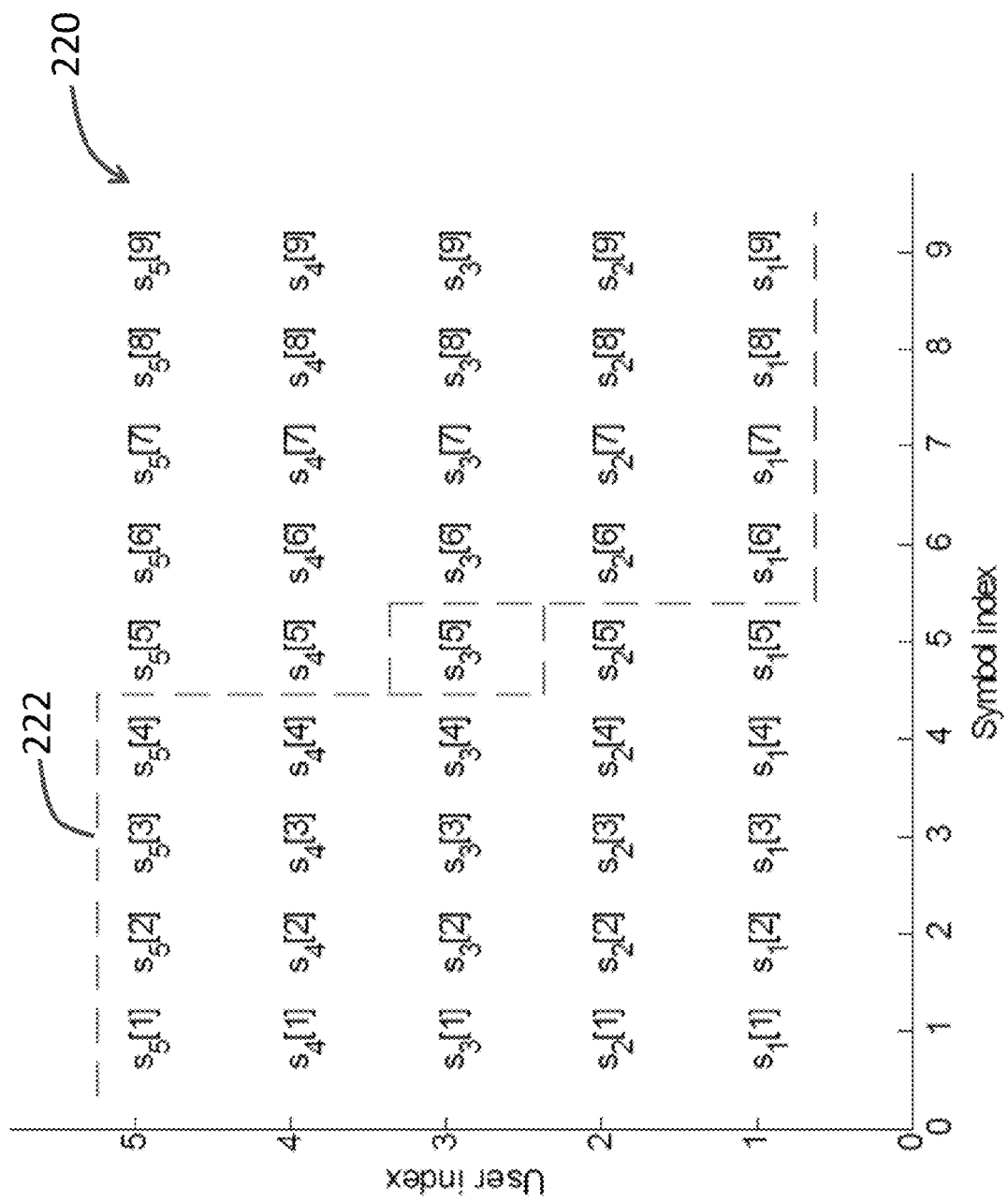
FIG. 9 is a diagram showing an example of the causality of interference caused by symbols of users.

Referring to FIG. 9, a diagram 220 illustrates the causality of interference for a multi-user system with K=5 and $L_D$=5, and different causalities are separated by dash lines 222. When the current symbol is $s_3[5]$, the symbols in the bottom left part of the diagram 220 serve as the causal interference to be pre-cancelled by the feedback filter, and the symbols in the top right part of the diagram 220 are the anti-causal interference to be suppressed by the waveform design.

Similar to the single-user case, we consider the linear part of the equivalent system in FIG. 8B. The mean-square error of user k in can be expressed as $$MSE_k = \sum_{j=1}^{K} \sum_{l=1}^{L_D-1} |\alpha_k h_{kl}^H g_j|^2 P_V + \sum_{j>k} |\alpha_k h_{kL_D}^H g_j|^2 P_V + \quad \text{(Equ. 22)}$$

$$|\alpha_k h_{kL_D}^H g_k - 1|^2 P_V + \sum_{j<k} |\alpha_k h_{kL_D}^H g_j - b_{kj}[L_D]|^2 P_V +$$

$$\sum_{j=1}^{K} \sum_{l=1}^{L_D-1} |\alpha_k h_{kl}^H g_j - b_{kj}[l]|^2 P_V + |\alpha_k|^2 P_N,$$

where $b_{kj}[\cdot]$ denotes the feedback filter of user k for pre-cancelling the interference of user j's data stream. In the following, we aim to jointly design the signature waveforms $\{g_k\}$, the feedback filters $\{b_k\}$, and the the gains $\{\alpha_k\}$ such that the total mean-square error is minimized. The optimal coefficients of the feedback filter are given by $$b_{kj}[l] = \begin{cases} \alpha_k h_{kl}^H g_j, & l = L_D+1, \ldots, 2L_D-1, \forall j, \text{ or } l = L_D, j < k, \\ 0, & \text{otherwise} \end{cases} \quad \text{(Equ. 23)}$$

Substituting Equation 23 into Equation 22, we have $$MSE_k = \sum_{j=1}^{K} \sum_{l=1}^{L_D-1} |\alpha_k h_{kl}^H g_j|^2 P_V + \quad \text{(Equ. 24)}$$

$$\sum_{j>k} |\alpha_k h_{kL_D}^H g_j|^2 P_V + |\alpha_k h_{kL_D}^H g_k - 1|^2 P_V + |\alpha_k|^2 P_N.$$

User k's optimal signature waveform $g_k$ relies on other users' optimal signature waveforms. Therefore, unlike the single-user case, the closed form global optimal solution of the multi-user problem may be difficult to find. The following describes two iterative algorithms or processes to search for locally optimal solutions. One approach is an alternating optimization method and the other approach is a gradient method. The convergence of both iterative algorithms can be demonstrated by showing the monotonicity of the objective functions during the iterations.

3.9 Alternating Optimization Algorithm

In some implementations, the alternating optimization algorithm iteratively optimizes over a restricted subset of all variables. In this algorithm, we iteratively update the signature waveforms $\{g_k\}$ and the gains $\{\alpha_k\}$ to optimize the total mean-square error subject to a power constraint. It will be shown that fixing one set of variables, optimization over the other set of variables is a convex problem and the closed-form solution can be derived. In some examples, the total mean-square error in each iteration is non-increasing and thus the alternating optimization algorithm is guaranteed to converge.

The gains $\{\alpha_k\}$ can be optimized given a set of fixed signature waveforms $\{g_k\}$ since the total mean-square error $\Sigma_{k=1}^{K} MSE_k$ is a quadratic function of $\{\alpha_k\}$. We can consider the first order condition, i.e., the first order derivative of the total mean-square error with respect to $\alpha_k$ equals zero, and obtain the following:

$$\alpha_k = \left( \sum_{j \geq k} |h_{kL_D}^H g_j|^2 + \sum_{j=1}^{K} \sum_{l=1}^{L_D-1} |h_{kl}^H g_j|^2 + \frac{P_N}{P_X} \right)^{-1} g_k^H h_{kL_D}, \forall k. \quad \text{(Equ. 25)}$$

Next, we consider the optimization of the signature waveforms $\{g_k\}$ subject to a power constraint, with a set of fixed gains $\{\alpha_k\}$. Directly taking the derivative of the Lagrangian with respect to $\{g_k\}$ leads to an expression in terms of the Lagrange multiplier $\lambda$ associated with the power constraint. Solving $\lambda$, however, may be difficult and numerical search may be used. Motivated by the techniques in Equations 6 to 11 where the Lagrange multiplier can be explicitly obtained, we can keep the ratio between $\{\alpha_k\}$ fixed and optimize the corresponding $\{g_k\}$ so that the Lagrange multiplier can be solved explicitly. That is, instead of fixing $\{\alpha_k\}$, we fix $\overline{\alpha}_k = \gamma^{-1} \alpha_k$, for all k, where $\gamma = \sqrt{\Sigma_k |\alpha_k|^2 / P_{max}}$, which means $\Sigma_k |\overline{\alpha}_k|^2 = P_{max}$, and $\gamma$ is considered as a variable in the optimization problem. The Lagrangian of minimizing the total mean-square error subject to the power constraint, with variables $\gamma$ and $g_k$, $\forall k$, is given by $$L(g_1, \ldots, g_K, \gamma, \lambda) = \sum_{k=1}^{K} MSE_k + \lambda \left( \sum_{k=1}^{K} g_k^H g_k - P_{max} \right). \quad \text{(Equ. 26)}$$

Taking the first order derivative of L with respect to $g_k^*$, we have $$\frac{\partial L}{\partial g_k^*} = 0 \Rightarrow g_k = \quad \text{(Equ. 27)}$$

$$\gamma^{-1} \overline{\alpha}_k^* \left( \sum_{j \geq k} |\overline{\alpha}_j|^2 h_{jL_D} h_{jL_D}^H + \sum_{j=1}^{K} \sum_{l=1}^{L_D-1} |\overline{\alpha}_j|^2 h_{jl} h_{jl}^H + \frac{\lambda}{P_X} I \right)^{-1} h_{kL_D}$$

Taking the first order derivative of L with respect to $\gamma$, we have $$\frac{\partial L}{\partial \gamma^*} = 0 \Rightarrow \gamma = \left( \sum_{k=1}^{K} \overline{\alpha}_k^* g_k^H h_{kL_D} \right) \quad \text{(Equ. 28)}$$

$$\left( \sum_{k=1}^{K} \left( \sum_{j \geq k} |\overline{\alpha}_j h_{jL_D}^H g_k|^2 + \sum_{j=1}^{K} \sum_{l=1}^{L_D-1} |\overline{\alpha}_j h_{jl}^H g_k|^2 + \frac{P_N}{P_X} |\overline{\alpha}_k|^2 \right) \right)^{-1}$$

From Equations 27 and 28, and the power constraint $\Sigma_k g_k^H g_k = P_{max}$, we have $\lambda = P_N$. By substituting $\gamma$ and $\lambda = P_N$ into Equation 27, the closed form solution of the signature waveform $g_k$ associated with user k can be obtained.

The exemplary alternating optimization algorithm, summarized in Table 1 below, fixes one set of variables and optimizes the other set of variables to decrease the total mean-square error until convergence or the maximum number of iterations is reached. When the signature waveforms $\{g_k\}$ are fixed, updating the gains $\{\alpha_k\}$ can only reduce the total mean-square error or keep it unchanged. Similarly, when the normalized gains $\{\overline{\alpha}_k\}$ are fixed, updating the signature waveforms $\{g_k\}$ also makes the total mean-square error non-increasing. In some examples, the alternating optimization algorithm always converges since the total mean-square error is always non-increasing during the iterations and the total mean-square error is lower bounded by zero. Note that the converged solution may not be a global optimum but it is a local optimum where none of the two optimization steps can further improve the performance.

TABLE 1

Alternating Optimization Algorithm for Multi-user Downlink Waveform Design (i) Initialize $\alpha_k = 1$, $\forall k$.
(ii) Loop :
    1. Calculate waveforms: $\{g_k\}$ and $\gamma$ by Equations 27 and 28.
    2. Calculate gains: $\{\alpha_k\}$ by Equation 25.
Until $\alpha_k$, $\{g_k\}$ and $\gamma$ converge or the max. number of iterations is reached.

3.10 Gradient Algorithm

In some implementations, the gradient method, by iteratively updating the variables to the steepest direction that decreases the objective function, is able to locate the global minimum for convex functions, or a local optimum for a wide class of non-convex functions. In some examples, we remove the dependence of $\{\alpha_k\}$ by substituting Equation 6 into the mean-square error in Equation 24 so that the gradient method can focus on updating $\{g_k\}$ only. The resulting total mean-square error as a function of $\{g_k\}$ is given by $$\sum_{k=1}^{K} MSE_k = P_V \sum_{k=1}^{K} \left(1 - t_k^{-1}|g_k^H h_{kL_D}|^2\right), \quad \text{(Equ. 29)}$$

where $$t_k = \sum_{j\geq k} |h_{kL_D}^H g_j|^2 + \sum_{j=1}^{K} \sum_{l=1}^{L_D-1} |h_{kl}^H g_j|^2 + \frac{P_N}{P_V}. \quad \text{(Equ. 30)}$$

It can be verified that the total mean-square error in Equation 29 is non-convex in $\{g_k\}$. The gradient of $g_k$ can be obtained as $$\Delta g_k = \frac{\partial}{\partial g_k^*}\left(\sum_k MSE_k\right) = \quad \text{(Equ. 31)}$$

$$P_V\left(-h_{kL_D} h_{kL_D}^H t_k^{-1} + \sum_{j=1}^{k} |g_j^H h_{jL_D}|^2 h_{jL_D} h_{jL_D}^H t_j^{-2} + \sum_{j=1}^{K} \sum_{l=1}^{L_D-1} |g_j^H h_{jL_D}|^2 h_{jl} h_{jl}^H t_j^{-2}\right) g_k.$$

The gradient algorithm is summarized in Table 2, where the waveforms are iteratively updated by $$g_k^{(n+1)} = proj_C\left[g_k^{(n)} - \delta^{(n)}\frac{\Delta g_k^{(n)}}{\|\Delta g_k^{(n)}\|_2}\right]. \quad \text{(Equ. 32)}$$

We choose the step size $\delta^{(n)}$ to be the harmonic sequence $$\frac{1}{d},$$

$d = 1, 2, \ldots$ for its good convergence behavior. The projection operator $proj_C$ is to project the updated waveforms into the constraint set $\Sigma_{k=1}^{K} g_k^H g_k = P_{max}$ by normalization. In each iteration, the total mean-square error generated by the proposed gradient algorithm is non-increasing. In some implementations, the sequence of the total mean-square error is non-increasing and bounded below, so the gradient algorithm is guaranteed to converge to a local minimum, where the gradient is zero.

TABLE 2

Gradient Algorithm for Multi-User Downlink Waveform Design (i) Initialize $g_k = h_{kL_D}$, $\forall k$.
(ii) Loop:
    (a) Calculate gradients: $\{\Delta g_k\}$ by Equation 31.
    (b) Update waveforms: $\{g_k^{(n)}\}$ by Equation 32.
    (c) Line search:
        If $\Sigma_k MSE_k^{(n)} > \Sigma_k MSE_k^{(n-1)}$
           $d = d + 1$, $\delta^{(n)} = \frac{1}{d}$.
           goto (b).
        else
           n = n + 1.
        end if
Until $\{g_k\}$ converge or the maximum number of iterations is reached.

3.11 Numerical Simulation

In this section, we describe numerical simulation results to show the performance of the joint waveform design and interference pre-cancellation. The Saleh-Valenzuela channel model for indoor environment is adopted to generate the instances of a multipath channel impulse response. In the Saleh-Valenzuela channel model with 500 MHz sampling rate, the average channel length is around 249.

In FIGS. 10A and 10B, we plot the equivalent channels, (g*h), i.e., the composite effect of the transmit waveform and the channel impulse response. Referring to FIG. 10A, a graph 230 shows the equivalent channel of using pure waveform design. Referring to FIG. 10B, a graph 240 shows the equivalent channel of using joint waveform design. Since the joint waveform design only suppresses the anti-causal interference and the causal part is pre-cancelled by the feedback filter, we can see that the causal interference 242 is unsuppressed and significantly larger than that of the pure waveform design in FIG. 10A. However, with the same degrees of freedom, the joint waveform design only needs to suppress about half of the interference compared to the pure waveform design, and it is able to achieve higher peak amplitude and better interference suppression for the anti-causal interference.

Figure 11:
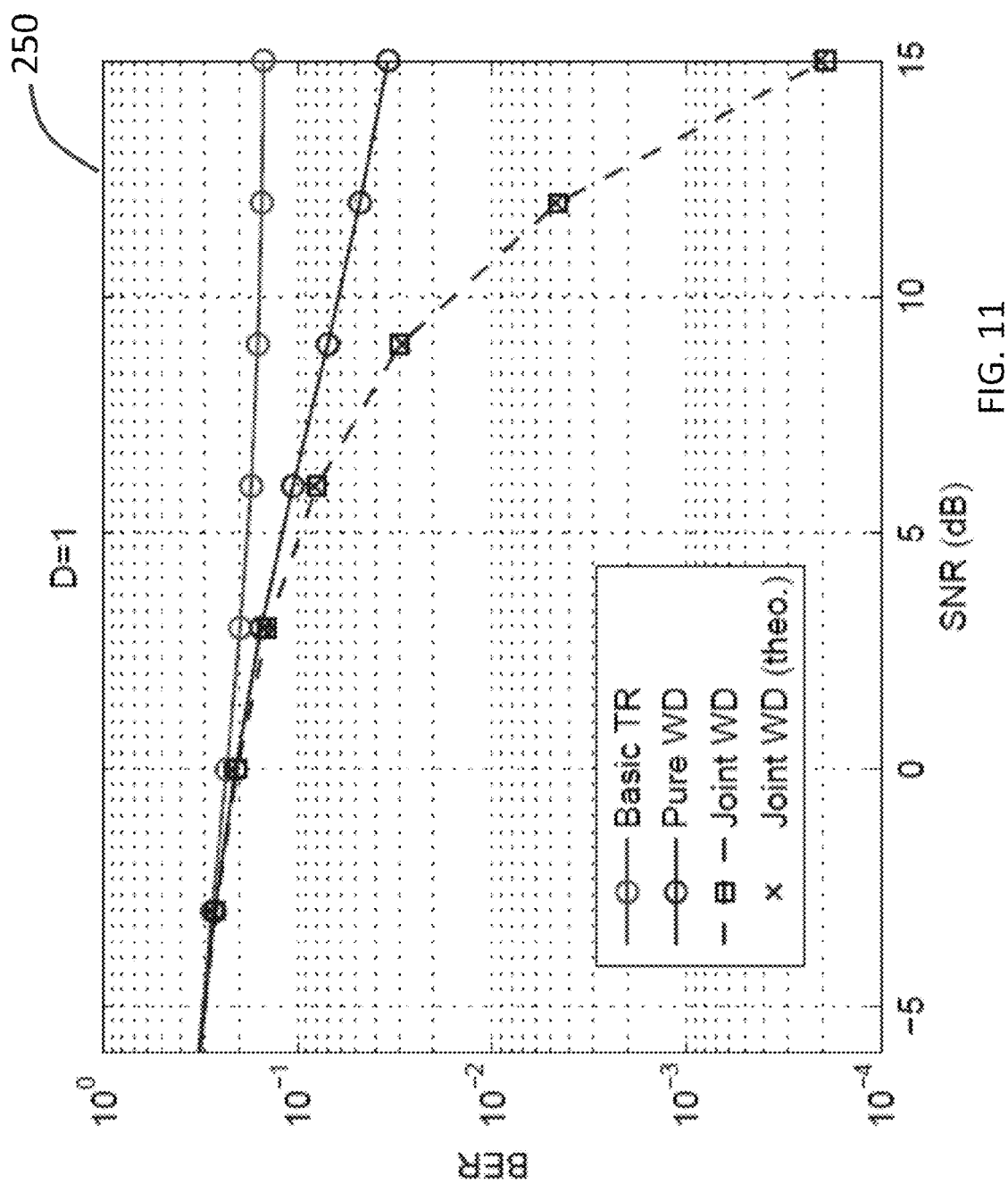
FIGS. 11 and 12 are graphs showing the bit error rate performance comparison of an exemplary basic time-reversal system, an exemplary time-reversal system using pure waveform design, and an exemplary time-reversal system using joint waveform design and interference pre-cancellation.
Figure 12:
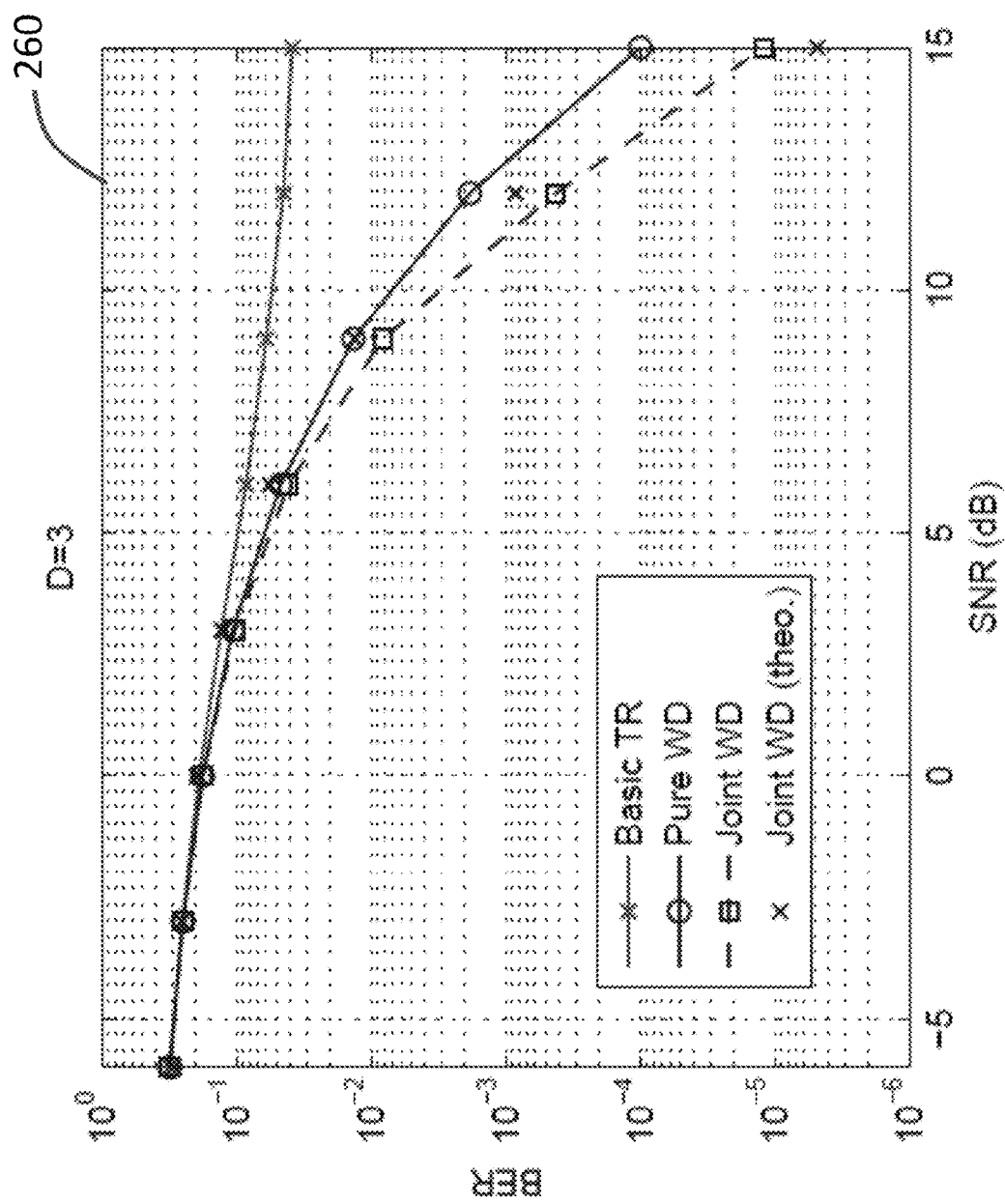

FIGS. 11 and 12 show the single-user bit error rate performance for different waveform design schemes when D=1 and D=3, respectively. Referring to FIG. 11, a graph 250 shows the bit error rate performance comparison of a basic time-reversal system, a system using pure waveform design, and a system using joint waveform design and interference pre-cancellation for D=1. The Saleh-Valenzuela channel model of indoor environment is used, where on average L=249. Referring to FIG. 12, a graph 260 shows the bit error rate performance comparison of the basic time-reversal system, the system using pure waveform design, and the system using joint waveform design and interference pre-cancellation for D=3, with Saleh-Valenzuela channel model of indoor environment where on average L=249.

The term "Basic TR" in the graphs 250 and 260 indicates that the time-reversed and conjugated version of the channel impulse response is used as the signature waveform. The joint waveform design can achieve a remarkable performance gain at high signal-to-noise ratio region for D=1 compared to D=3. This is because when D is smaller, i.e., the symbol rate is higher, and when the signal power is more dominant than the noise power, the interference is more severe and the joint design has a substantial advantage under such a scenario. The theoretical analysis of the bit error rate performance for the joint design with D=1 is quite close to the simulated result. The theoretical bit error rate of D=1 is more accurate than D=3 because the analysis is greatly based on the assumption of a Gaussian distributed interference, and a smaller rate back-off factor results in more interfering multipaths, which makes the distribution of the inter-symbol interference more similar to a Gaussian one.

Figures 13A, 13B:
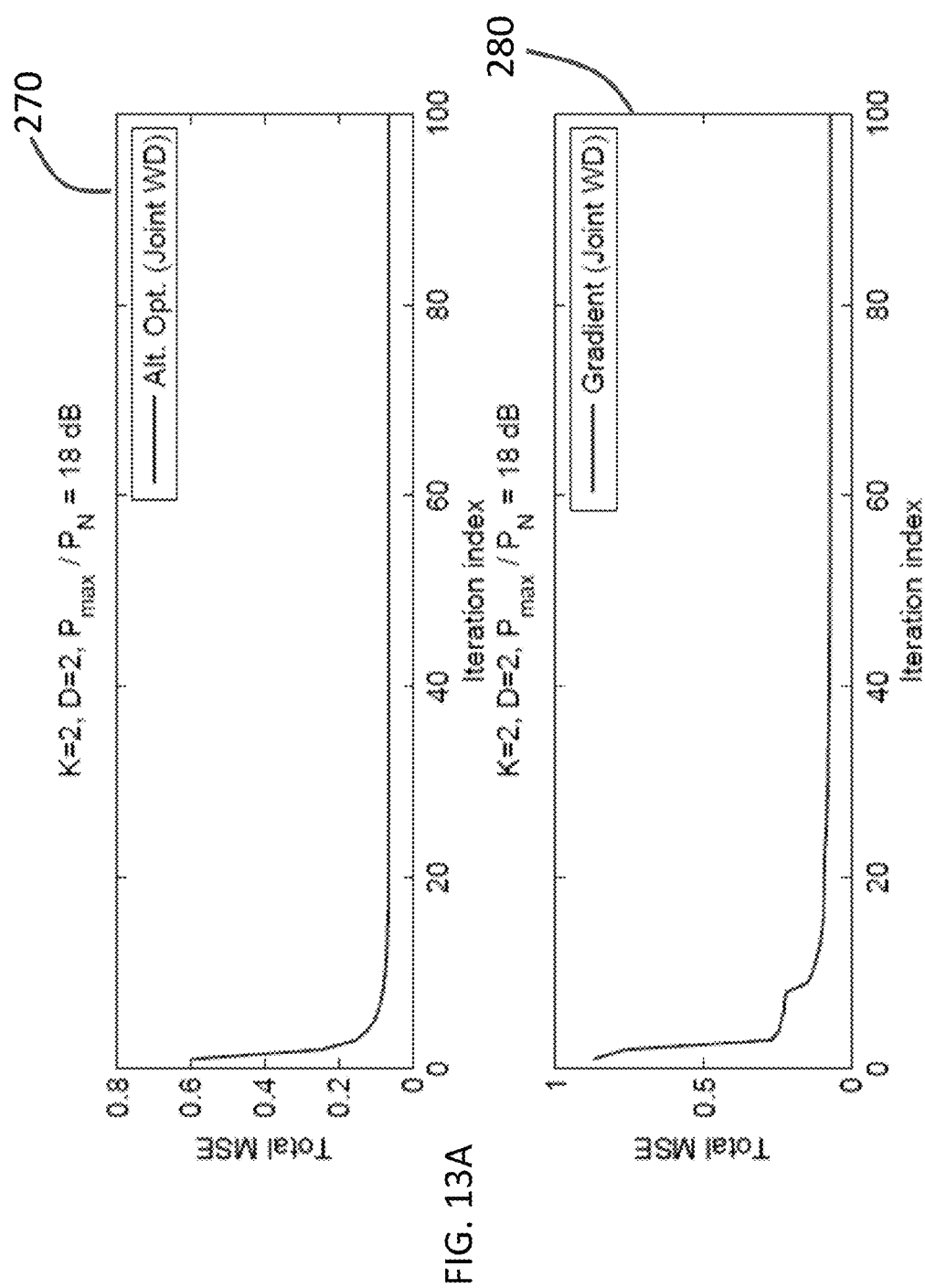
FIGS. 13A and 13B are graphs showing the convergence behavior of the two exemplary iterative algorithms.

Exemplary convergence behaviors of the two iterative algorithms are plotted in FIGS. 13A and 13B with K=2, D=2 and $P_{max}/P_N$=18 dB. Referring to FIG. 13A, a graph 270 shows that the average number of convergence for the alternating optimization algorithm is 10.34 at 0 dB and 26.88 at 18 dB. Referring to FIG. 13B, a graph 280 shows that for the gradient method, the average number of iterations is 7.49 at 0 dB and 48.51 at 18 dB. When $P_{max}/P_N$ is low, the noise power dominates the interference power, and thus the waveform calculation is easier since a user's signature waveform can be close to the basic time-reversal waveform which is based on its own channel and irrelevant to the others'. On the other hand, when the noise power is low, the severe inter-symbol interference and inter-user interference greatly influence the performance, and a user's signature waveform has to take into account other users' waveforms to avoid the interference. Therefore, high $P_{max}/P_N$ region typically requires more iterations for the algorithms to converge.

For both the alternating optimization algorithm and the gradient algorithm, the ordering of users has to be determined first. As discussed in sections 3.8 to 3.10, finding the optimal ordering may require an exhaustive search. In some implementations, heuristic algorithms for finding a suboptimal user ordering can be adopted. Let us consider the initial step in the alternating optimization algorithm, the $\alpha_k$'s are initialized to be the same, and by substituting the solutions of $g_k$'s into the mean-square error in Equation 24, the resulting total mean-square error is given by $$\sum_{k=1}^{K} MSE_k = \sum_{k=1}^{K} P_V\left(1 - h_{\pi_k L_D} T_{\pi_k}^{-1} h_{\pi_k L_D}\right),$$ (Equ. 33)

where $$T_{\pi_k} = \sum_{j \leq k} h_{\pi_j L_D} h_{\pi_j L_D}^H + \sum_{j=1}^{K} \sum_{l=1}^{L_D} h_{\pi_j l} h_{\pi_j l}^H + \frac{P_N}{P_V} I.$$ (Equ. 34)

We consider a greedy algorithm exploiting the fact that $T_{\pi_k}$ does not depend on the particular ordering of $\{\pi_j, j \leq k\}$ for the first term in Equation 34 and the second term is the sum of all users' causal inter-symbol interference and does not rely on the overall ordering. Based on this, once $\{\pi_j, j > k\}$ is determined, $MSE_k$ can be optimized by choosing $\pi_k$. We can sequentially choose $\pi_K, \ldots, \pi_1$, i.e., the greedy $\{\pi_k^G\}$ can be determined by $$\pi_k^G = \arg \max_{\pi_k \notin \{\pi_j^G, j > k\}} h_{\pi_k L_D} T_{\pi_k}^{-1} h_{\pi_k L_D},$$ (Equ. 35)

for $k = K, K-1 \ldots, 1$.

Such a greedy approach is not globally optimal because firstly, the objective function in Equation 33 is an approximation since we assume $\{\alpha_k\}$ the same, and secondly, even if the globally optimal $\{\pi_j, j > k\}$ can be found, the subsequent global optimization of $\pi_k$ has to take into account all terms in Equation 33 instead of only $$h_{\pi_k L_D} T_{\pi_k}^{-1} h_{\pi_k L_D},$$

but such optimization is quite involved and may not provide a better solution other than the exhaustive search.

Figure 14:
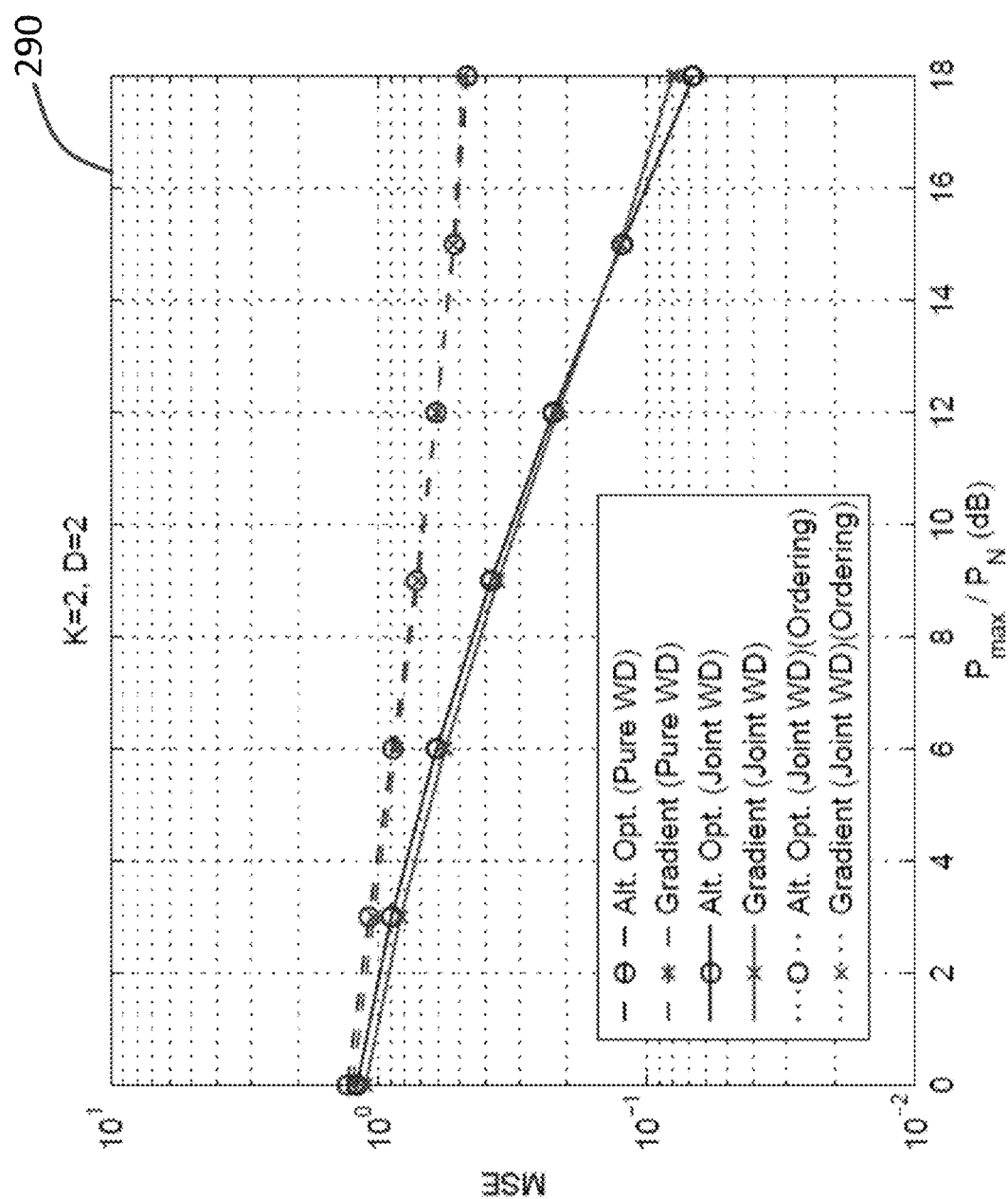
FIG. 14 is a graph comparing the total mean-square error performance of an exemplary alternating optimization method and an exemplary gradient method for K=2 and D=2.
Figure 15:
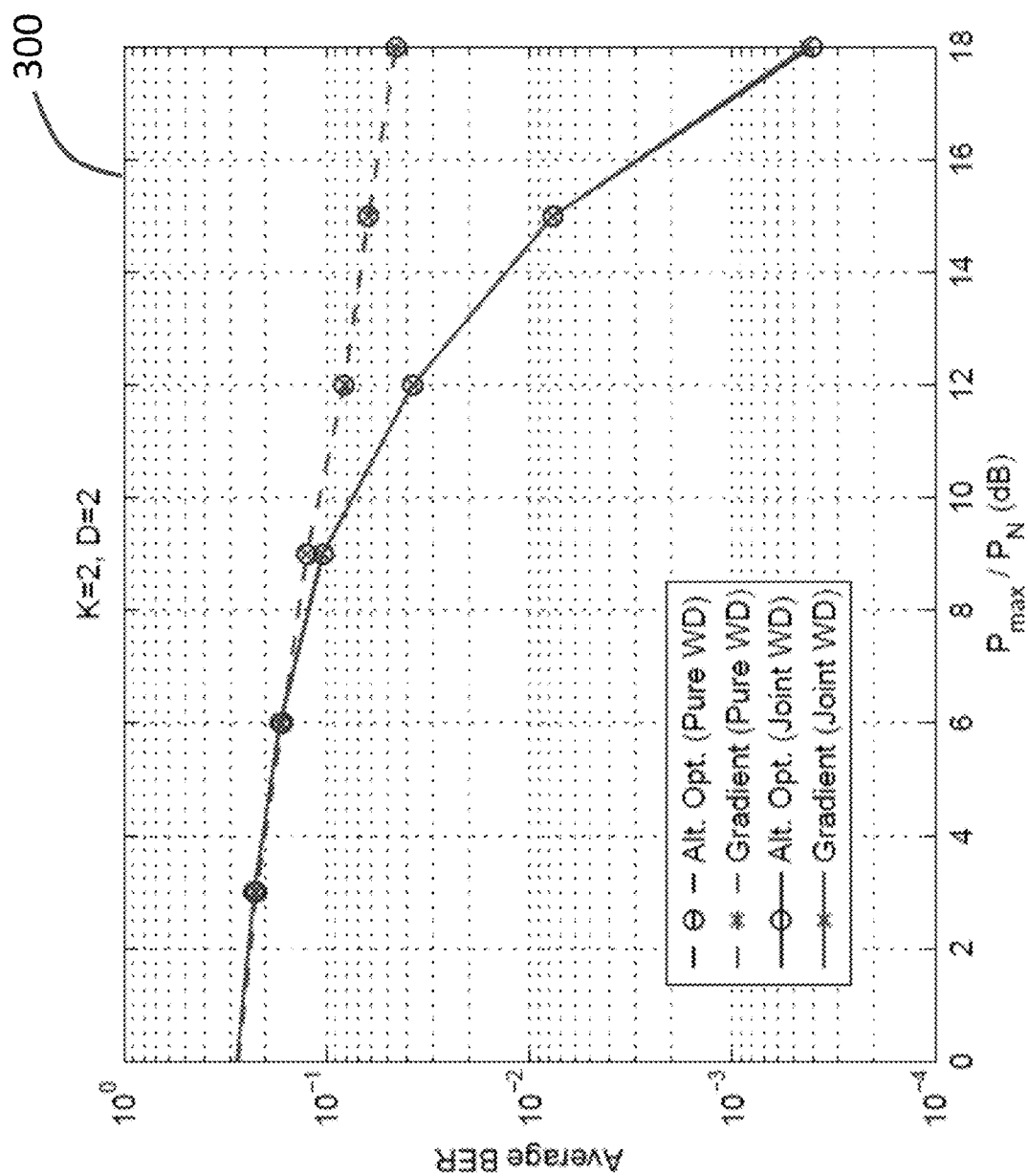
FIG. 15 is a graph comparing the average bit error rate performance of the exemplary alternating optimization method and the exemplary gradient method for K=2 and D=2.

In FIGS. 14 and 15, we compare the total mean-square error and the average bit error rate performance, respectively, of the iterative methods with K=2 and D=2 with Saleh-Valenzuela channel model of indoor environment where on average L=249. Referring to FIG. 14, a graph 290 shows that, for the total mean-square error, the alternating optimization algorithm performs slightly better than the gradient method at the high power region while it performs a bit worse at the low power region. However, such a difference does not appear obvious in the average bit error rate performance, as shown in a graph 300 of FIG. 15. In this example, the greedy ordering algorithm does not show a perceivable advantage since the current symbols only contribute a small portion to the total interference.

Figure 16:
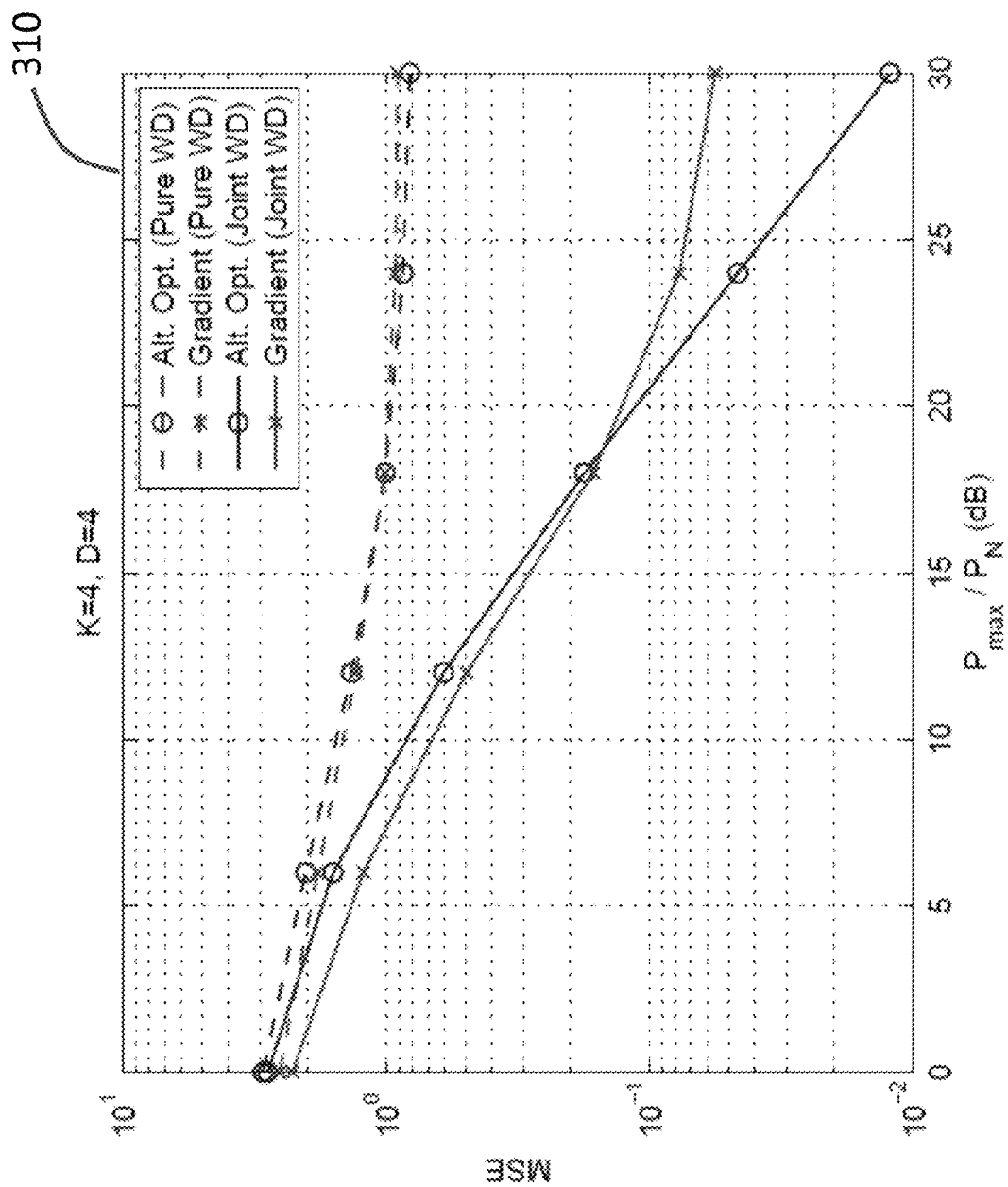
FIG. 16 is a graph comparing the total mean-square error performance of the exemplary alternating optimization method and the exemplary gradient method for K=4 and D=4.
Figure 17:
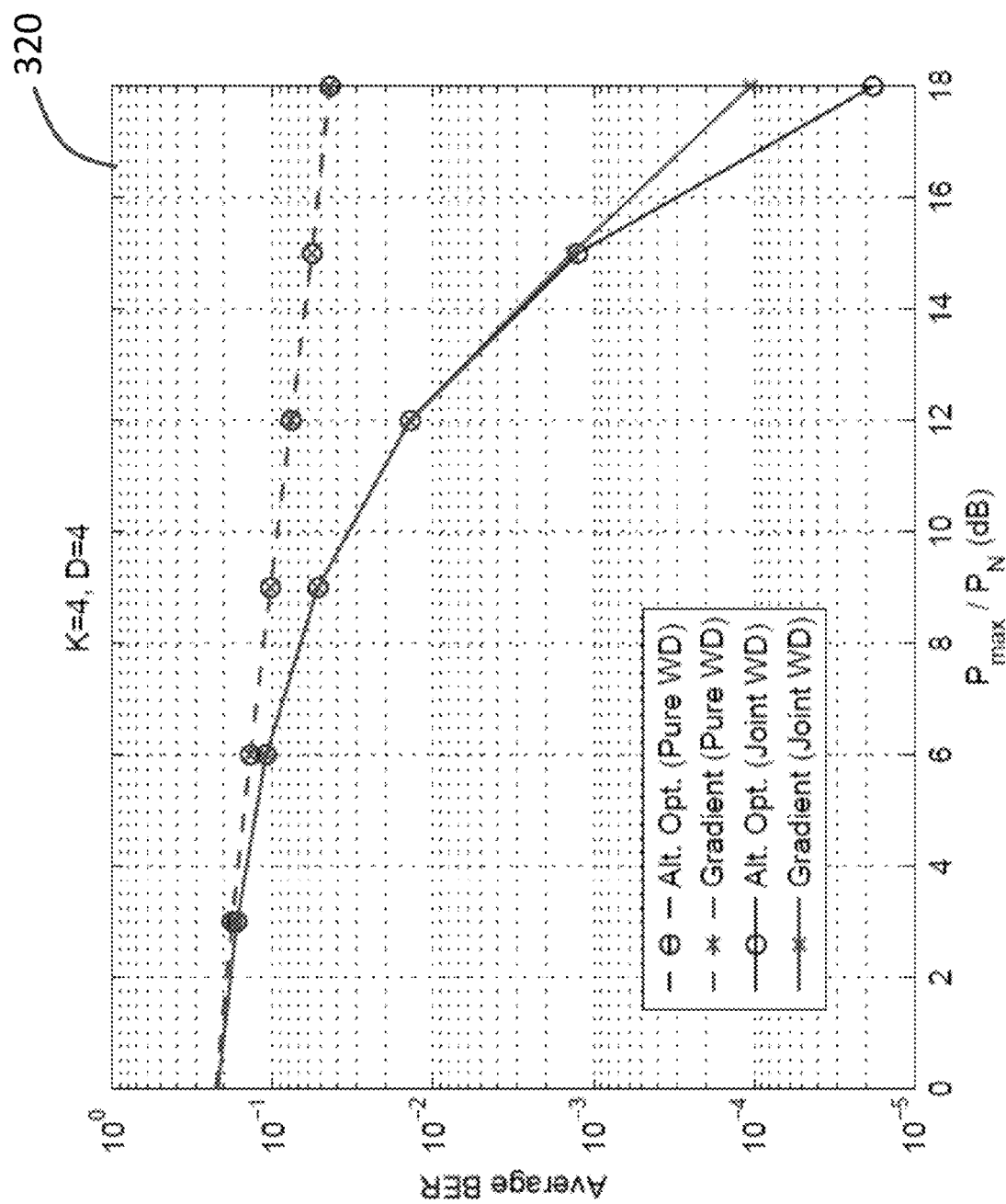
FIG. 17 is a graph comparing the bit error rate performance of the exemplary alternating optimization method and the exemplary gradient method for K=4 and D=4.

Referring to FIGS. 16 and 17, graphs 310 and 320 show the average bit error rate and the total mean-square error, respectively, for K=4 and D=4, with Saleh-Valenzuela channel model of indoor environment where on average L=249. We can observe a similar comparison of the two algorithms for the total mean-square error performance with a magnified difference. Specifically, for both the total mean-square error and the average bit error rate performance at the high power region, the alternating optimization shows a noticeable advantage over the gradient algorithm. At the low power region, the total mean-square error performance of the gradient method is slightly superior than the alternating optimization algorithm, but such a difference is imperceptible in the average bit error rate performance.

In this document, we described the joint waveform design and interference pre-cancellation for time-reversal communication systems by exploiting the symbol information available at the transmitter. In some implementations, the optimal joint design is to pre-cancel the causal interference by a feedback filter and to suppress the anti-causal interference using the waveform design. For the multi-user scenario, the causality of both inter-symbol interference and inter-user interference determines its similar role in the joint design. The resulting multi-user waveform design is a non-convex optimization problem, for which we described two iterative algorithms, including an alternating optimization algorithm and a gradient method. In some examples, both algorithms can be guaranteed to converge to suboptimal solutions. Simulation results were shown to validate the convergence of the algorithms and demonstrate the effectiveness of the joint design, especially in the high interference regime. Applications of the joint design can be applied to multi-antenna scenarios by pre-cancelling the causal interference and suppressing the anti-causal interference.

In some implementations, the base station (e.g., 152 or 172) can be part of a mobile or stationary device. For example, the base station can be implemented as part of a sensor module, a controller, a mobile phone, a laptop computer, a desktop computer, a modem, a router, or an electronic appliance that communicates wirelessly with multiple other devices. For example, a mobile phone or a laptop computer may communicate simultaneously with a television, a printer, a thermometer, a radio, a refrigerator, a lighting control system, and other devices using the techniques described above.

The base stations can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Other embodiments are within the scope of the following claims.

What is claimed is:

1. An apparatus comprising:
 a base station comprising:
  an input module to receive a probe signal sent from a terminal device; and
  a data processor configured to:
   determine a gain value based on channel information, the gain value to be applied by the terminal device to received data symbols,
   generate a signature waveform that is based on channel information derived from the probe signal,
   identify data symbols intended to be transmitted to the terminal device, and modify the data symbols based on the channel information, the modification of the data symbols designed to reduce inter-symbol interference when the data symbols are received by the terminal device, and
   generate a downlink signal based on the modified data symbols and the signature waveform;
  wherein the base station is configured to generate a wide-band radio frequency signal based on the downlink signal and transmit the radio frequency signal to the terminal device through a multipath channel such that a portion of the radio frequency signal intended for the terminal device focuses at the terminal device.

2. The apparatus of claim 1 in which the wide-band a radio frequency signal includes a second portion intended for a second terminal device located at a distance from the first terminal device, in which the second portion of the radio frequency signal focuses at the second terminal device.

3. The apparatus of claim 1 in which the first portion of the radio frequency signal intended for the first terminal device and the second portion of the radio frequency signal intended for the second terminal device occupy a same frequency band and are transmitted from the base station simultaneously.

4. The apparatus of claim 1 in which the base station further comprises a radio frequency modulator to modulate the downlink signal to generate the wide-band radio frequency signal.

5. The apparatus of claim 1 in which the signature waveform comprises a complex signal having a real part and an imaginary part.

6. The apparatus of claim 1 in which the data processor is configured to generate the signature waveform based on a time-reversed signal of the channel response signal.

7. The apparatus of claim 1 in which the data processor is configured to generate the downlink signal by performing a convolution of the signature waveform and the modified data symbols.

8. The apparatus of claim 1 in which the data processor is configured to modify the data symbols by subtracting, from each data symbol, a term that is associated with inter-symbol interference.

9. The apparatus of claim 8 in which the data processor is configured to calculate the term based on the channel information and the signature waveform.

10. The apparatus of claim 1 in which the data processor is configured to modify a data symbol by subtracting, from the data symbol, a term that is calculated based on at least one previous data symbol, the signature waveform, and channel information.

11. The apparatus of claim 1 in which the data processor is configured to generate the signature waveform based on the channel information and the gain value.

12. The apparatus of claim 11 in which the signature waveform has an inverse relationship with respect to the gain value.

13. The apparatus of claim 1 in which the base station comprises at least one of a mobile phone, a camera, a laptop computer, a tablet computer, a wearable computing device, a pair of eyeglasses, a helmet, a goggle, a car, a personal transportation device, a robot, a robotic arm, an unmanned aerial vehicle, a radio, an audio player, a health monitor, a headphone, an object tracker, a name tag, a clothing tag, a merchandise tag, a packaging box, a pen, a stylus, a watch, a bracelet, a necklace, or a cart.

14. An apparatus comprising:
a first device of a communication system, in which the first device comprises an input module and a data processor;
wherein the first device is configured to transmit a wide-band radio frequency signal designed such that after the radio frequency signal propagates through a multipath channel, a first portion of the radio frequency signal intended for a second device focuses at the second device, and a second portion of the radio frequency signal intended for a third device focuses at the third device located at a distance from the second device,
wherein the input module of the first device is configured to receive a probe signal sent from the second device;
wherein the data processor of the first device is configured to:
determine a gain value based on channel information derived from the probe signal, the gain value to be applied by the second device to received data symbols,
identify data symbols intended to be transmitted to the second device, and
modify the data symbols based on the channel information, the modification of the data symbols designed to reduce inter-symbol interference when the data symbols are received by the second device.

15. The apparatus of claim 14 in which the data processor of the first device is configured to:
generate a signature waveform that is based on channel information derived from the probe signal, and
generate a transmit signal based on the modified data symbols and the signature waveform.

16. The apparatus of claim 15 in which the first device further comprises a radio frequency modulator to modulate the downlink signal to generate the wide-band radio frequency signal.

17. The apparatus of claim 15 in which the data processor is configured to generate the signature waveform based on a time-reversed signal of the channel response signal.

18. The apparatus of claim 15 in which the data processor is configured to generate the transmit signal by performing a convolution of the signature waveform and the modified data symbols.

19. The apparatus of claim 15 in which the data processor is configured to modify the data symbols by subtracting, from each data symbol, a term that is associated with inter-symbol interference.

20. The apparatus of claim 19 in which the data processor is configured to calculate the term based on the channel information and the signature waveform.

21. The apparatus of claim 15 in which the data processor is configured to modify a data symbol by subtracting, from the data symbol, a term that is calculated based on at least one previous data symbol, the signature waveform, and channel information.

22. The apparatus of claim 15 in which the signature waveform comprises a complex signal having a real part and an imaginary part.

23. The apparatus of claim 14 in which the data processor is configured to generate the signature waveform based on the channel information and the gain value.

24. The apparatus of claim 23 in which the signature waveform has an inverse relationship with respect to the gain value.

25. The apparatus of claim 14 in which the first portion of the radio frequency signal intended for the second device and the second portion of the radio frequency signal intended for the third device occupy a same frequency band and are transmitted from the first device simultaneously.

26. The apparatus of claim 14 in which the apparatus comprises at least one of a mobile phone, a camera, a laptop computer, a tablet computer, a wearable computing device, a pair of eyeglasses, a helmet, a goggle, a car, a personal transportation device, a robot, a robotic arm, an unmanned aerial vehicle, a radio, an audio player, a health monitor, a headphone, an object tracker, a name tag, a clothing tag, a merchandise tag, a packaging box, a pen, a stylus, a watch, a bracelet, a necklace, or a cart.

27. A method comprising:
at a first device, receiving a probe signal sent from a second device through a multipath channel;
at the first device, determining a gain value based on channel information, the gain value to be applied by the second device to received data symbols;
at the first device, generating a signature waveform that is based on channel information derived from the probe signal;
at the first device, identifying data symbols intended to be transmitted to the second device, and modifying the data symbols based on channel information, the modification of the data symbols designed to reduce inter-symbol interference when the data symbols are received by the second device; and generating a transmission signal based on the modified data symbols and the signature waveform.

28. The method of claim 27 in which the transmission signal has a first component and a second component, the first component includes data symbols intended for the second device, the second component includes data symbols intended for a third device, and the method comprises transmitting the first and second components simultaneously.

29. The method of claim 27 in which the signature waveform comprises a complex signal having a real part and an imaginary part.

30. The method of claim 27 in which generating a signature waveform comprises generating a signature waveform that is based on a time-reversed signal of the channel response signal.

31. The method of claim 27 in which generating the transmission signal comprises performing a convolution of the signature waveform and the modified data symbols.

32. The method of claim 27 in which modifying the data symbols comprises subtracting, from each data symbol, a term that is associated with inter-symbol interference.

33. The method of claim 32 in which the term is calculated based on the channel information and the signature waveform.

34. The method of claim 27 in which modifying a data symbol comprises subtracting, from the data symbol, a term that is calculated based on at least one previous data symbol, the signature waveform, and channel information.

35. The method of claim 27 in which generating a signature waveform comprises generating a signature waveform based on the channel information and the gain value.

36. The method of claim 35 in which the signature waveform has an inverse relationship with respect to the gain value.

37. A method comprising:
at a first device, receiving a probe signal sent from a second device through a multipath channel, in which the first and second devices are part of a wide-band communication system configured such that when the first device transmits a radio frequency signal intended for the second device through the multipath channel, the radio frequency signal focuses at the second device;
at the first device, determining a gain value to be applied by the second device to data symbols received at the second device;
at a first device, receiving a probe signal sent from a second device through a multipath channel, the probe signal received at the first device having a waveform that is different from the waveform sent by the second device due to influence of the multipath channel;
at the first device, generating a signature waveform that is based on channel information derived from the probe signal;
at the first device, identifying data symbols intended to be transmitted to the second device, and modifying the data symbols based on channel information, the modification of the data symbols designed to reduce inter-symbol interference when the data symbols are received by the second device; and
generating a transmission signal based on the modified data symbols and the signature waveform.

38. The method of claim 37, comprising modifying the signature waveform based on channel information, the modification of the signature waveform designed to reduce inter-symbol interference when the data symbols are received by the second device.

39. The method of claim 37 in which the transmission signal has a first component and a second component, the first component includes data symbols intended for the second device, the second component includes data symbols intended for a third device, and the method comprises transmitting the first and second components simultaneously.

40. The method of claim 37 in which the signature waveform comprises a complex signal having a real part and an imaginary part.

41. The method of claim 37 in which generating a signature waveform comprises generating a signature waveform that is based on a time-reversed signal of the channel response signal.

42. The method of claim 37 in which generating the transmission signal comprises performing a convolution of the signature waveform and the modified data symbols.

43. The method of claim 37 in which modifying the data symbols comprises subtracting, from each data symbol, a term that is associated with inter-symbol interference.

44. The method of claim 43 in which the term is calculated based on the channel information and the signature waveform.

45. The method of claim 37 in which modifying a data symbol comprises subtracting, from the data symbol, a term that is calculated based on at least one previous data symbol, the signature waveform, and channel information.

46. The method of claim 45, comprising determining a gain value based on the channel information, the gain value to be applied by the second device to the received data symbols.

47. The method of claim 46 in which generating a signature waveform comprises generating a signature waveform based on the channel information and the gain value.

48. The method of claim 47 in which the signature waveform has an inverse relationship with respect to the gain value.

* * * * *